(12) United States Patent
Luo et al.

(10) Patent No.: US 11,877,319 B2
(45) Date of Patent: Jan. 16, 2024

(54) REPEATER INITIATED CHANNEL OCCUPANCY TIME FOR SHARED RADIO FREQUENCY SPECTRUM

(71) Applicant: QUALCOMM Incorporated, San Diego, CA (US)

(72) Inventors: Jianghong Luo, Skillman, NJ (US); Jing Sun, San Diego, CA (US); Xiaoxia Zhang, San Diego, CA (US); Navid Abedini, Basking Ridge, NJ (US); Naeem Akl, Somerville, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/471,632

(22) Filed: Sep. 10, 2021

(65) Prior Publication Data
US 2023/0085403 A1 Mar. 16, 2023

(51) Int. Cl.
*H04W 74/08* (2009.01)
*H04W 72/20* (2023.01)

(52) U.S. Cl.
CPC ....... *H04W 74/0808* (2013.01); *H04W 72/20* (2023.01)

(58) Field of Classification Search
CPC .............................. H04W 16/26; H04W 88/04
See application file for complete search history.

(56) References Cited

U.S. PATENT DOCUMENTS

2007/0248117 A1* 10/2007 Zuniga .............. H04W 72/0446
370/468
2014/0126461 A1* 5/2014 Ghosh ................... H04W 16/26
370/336

(Continued)

FOREIGN PATENT DOCUMENTS

| CN | 112822748 A | 5/2021 |
| WO | WO-2021038121 A1 | 3/2021 |
| WO | WO-2022029965 A1 * | 2/2022 |

OTHER PUBLICATIONS

International Search Report and Written Opinion—PCT/US2022/042357—ISA/EPO—dated Dec. 5, 2022.

*Primary Examiner* — Benjamin Lamont
(74) *Attorney, Agent, or Firm* — Holland & Hart LLP

(57) ABSTRACT

Methods, systems, and devices for wireless communications are described. For example, a first communication device may receive, from a second communication device, control signaling triggering a channel access procedure at the first communication device. In some case, the channel access procedure may be for accessing the shared radio frequency spectrum. The first communication device may then perform the channel access procedure based on the control signaling. In some examples, the first communication device may, based on the channel access procedure, transmit an indication of a channel occupancy initiated by the first communication device to the second communication device. The first communication device may relay communications between the second communication device and a third communication device during a channel occupancy time (COT) based on the transmitted indication of the channel occupancy initiated by the first communication device.

30 Claims, 11 Drawing Sheets

(56) References Cited

U.S. PATENT DOCUMENTS

| | | | | |
|---|---|---|---|---|
| 2017/0332425 A1* | 11/2017 | Tenny | ............... | H04W 76/14 |
| 2017/0353819 A1 | 12/2017 | Yin et al. | | |
| 2018/0176955 A1* | 6/2018 | Salem | ............... | H04W 74/0808 |
| 2019/0305923 A1* | 10/2019 | Luo | ............... | H04W 72/1278 |
| 2019/0335504 A1* | 10/2019 | Chakraborty | ..... | H04W 74/0808 |
| 2020/0296650 A1* | 9/2020 | Zuo | ............... | H04W 40/22 |
| 2020/0314917 A1 | 10/2020 | Jeon et al. | | |
| 2020/0351669 A1 | 11/2020 | Xu et al. | | |
| 2021/0092783 A1* | 3/2021 | Sun | ............... | H04W 74/085 |
| 2022/0060246 A1* | 2/2022 | Tiirola | ............... | H04B 7/2643 |
| 2022/0272753 A1* | 8/2022 | Hakola | ............... | H04W 74/0816 |
| 2022/0272754 A1* | 8/2022 | Lei | ............... | H04W 74/0866 |

\* cited by examiner

REPEATER INITIATED CHANNEL OCCUPANCY TIME FOR SHARED RADIO FREQUENCY SPECTRUM

FIELD OF TECHNOLOGY

The following relates to wireless communications, including repeater initiated channel occupancy time (COT) for shared radio frequency spectrum.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). These communication devices may communicate via a repeater (also referred to as a repeater device) to extend a geographic coverage area. For example, the wireless multiple-access communications system may deploy a repeater device to extend a geographic coverage area around, or because of, blockages in the wireless multiple-access communications system.

SUMMARY

Various aspects of the present disclosure relate to enabling a communication device to support wireless communication according to a repeater initiated COT for shared radio frequency spectrum. Multiple communication devices may communicate via a repeater device over a shared radio frequency spectrum. For example, a first communication device (such as, a repeater device) may receive, from a second communication device (e.g., a base station), control signaling triggering a channel access procedure at the repeater device. In some case, the channel access procedure may be for accessing the shared radio frequency spectrum. The repeater device may then perform the channel access procedure based on the control signaling. In some examples, the repeater device may, based on the channel access procedure, transmit an indication of a channel occupancy initiated by the repeater device to the second communication device (e.g., the base station). The repeater device may relay communications between the second communication device and a third communication device (e.g., a UE) during a COT based on the transmitted indication of the channel occupancy initiated by the repeater device. The present disclosure may therefore include features for improvements to power consumption and, in some examples, may promote higher reliability and lower latency wireless communications, among other benefits.

A method for wireless communication at a first device is described. The method may include receiving, from a second device, first control signaling triggering a channel access procedure at the first device, the channel access procedure for accessing a shared radio frequency spectrum, performing the channel access procedure based on the first control signaling, transmitting, to the second device, an indication of a channel occupancy initiated by the first device, based on the channel access procedure, and relaying communications between the second device and a third device during a COT based on the transmitted indication of the channel occupancy initiated by the first device.

An apparatus for wireless communication at a first device is described. The apparatus may include a processor, memory coupled with the processor, and instructions stored in the memory. The instructions may be executable by the processor to cause the apparatus to receive, from a second device, first control signaling triggering a channel access procedure at the first device, the channel access procedure for accessing a shared radio frequency spectrum, perform the channel access procedure based on the first control signaling, transmit, to the second device, an indication of a channel occupancy initiated by the first device, based on the channel access procedure, and relay communications between the second device and a third device during a COT based on the transmitted indication of the channel occupancy initiated by the first device.

Another apparatus for wireless communication at a first device is described. The apparatus may include means for receiving, from a second device, first control signaling triggering a channel access procedure at the first device, the channel access procedure for accessing a shared radio frequency spectrum, means for performing the channel access procedure based on the first control signaling, means for transmitting, to the second device, an indication of a channel occupancy initiated by the first device, based on the channel access procedure, and means for relaying communications between the second device and a third device during a COT based on the transmitted indication of the channel occupancy initiated by the first device.

A non-transitory computer-readable medium storing code for wireless communication at a first device is described. The code may include instructions executable by a processor to receive, from a second device, first control signaling triggering a channel access procedure at the first device, the channel access procedure for accessing a shared radio frequency spectrum, perform the channel access procedure based on the first control signaling, transmit, to the second device, an indication of a channel occupancy initiated by the first device, based on the channel access procedure, and relay communications between the second device and a third device during a COT based on the transmitted indication of the channel occupancy initiated by the first device.

Some examples of the method, apparatuses, and non-transitory computer-readable medium described herein may further include operations, features, means, or instructions for stopping the relaying of the communications between the second device and the third device based on the COT.

Some examples of the method, apparatuses, and non-transitory computer-readable medium described herein may further include operations, features, means, or instructions for receiving, from the second device, a second indication indicating a lapsing of the COT and where stopping the relaying of the communications between the second device and the third device may be further based on the second indication indicating the lapsing of the COT.

Some examples of the method, apparatuses, and non-transitory computer-readable medium described herein may further include operations, features, means, or instructions for determining that the COT satisfies a threshold value, the threshold value indicating a maximum COT, the threshold value may be preconfigured or indicated by the first control signaling triggering the channel access procedure at the first device and where stopping the relaying of the communications between the second device and the third device may be further based on determining that the COT satisfies the threshold value.

In some examples of the method, apparatuses, and non-transitory computer-readable medium described herein, transmitting the indication of the channel occupancy may include operations, features, means, or instructions for generating a preamble sequence based on a configuration, the preamble sequence identifying the channel occupancy initiated by the first device and transmitting, to the second device, the generated preamble sequence.

In some examples of the method, apparatuses, and non-transitory computer-readable medium described herein, the generated preamble includes one or more of a maximum duration of the COT, or a scrambling between the generated preamble and an identifier associated with the first device.

In some examples of the method, apparatuses, and non-transitory computer-readable medium described herein, transmitting the indication of the channel occupancy may include operations, features, means, or instructions for transmitting, in a control message over a control channel, the indication of the channel occupancy initiated by the first device, the control message including one or more of an uplink control information (UCI), a downlink control information (DCI), or a medium access control-control element (MAC-CE), the control channel including one or more of a physical uplink control channel (PUCCH), a physical uplink shared channel (PUSCH), a physical downlink control channel (PDCCH), or a physical downlink shared channel (PDSCH).

Some examples of the method, apparatuses, and non-transitory computer-readable medium described herein may further include operations, features, means, or instructions for receiving scheduling information on at least one resource of a set of resources allocated for transmitting, to the second device, the indication of the channel occupancy initiated by the first device, where the at least one resource corresponds to the at least one occasion, and where the scheduling information may be included in the first control signaling.

Some examples of the method, apparatuses, and non-transitory computer-readable medium described herein may further include operations, features, means, or instructions for initiating the channel access procedure at the first device based on the first control signaling and where performing the channel access procedure may be further based on initiating the channel access procedure at the first device.

Some examples of the method, apparatuses, and non-transitory computer-readable medium described herein may further include operations, features, means, or instructions for determining, based on the first control signaling, one or more of a timing offset associated with the channel access procedure, a periodicity associated with the channel access procedure, a type associated with the channel access procedure, or any combination thereof and where performing the channel access procedure may be further based on one or more of the timing offset associated with the channel access procedure, the periodicity associated with the channel access procedure, the type associated with the channel access procedure, or any combination thereof.

Some examples of the method, apparatuses, and non-transitory computer-readable medium described herein may further include operations, features, means, or instructions for determining, based on the first control signaling, one or more of a timing offset associated with the COT, a periodicity associated with the COT, a threshold associated with the COT, one or more resources for indicating the COT, or any combination thereof.

Some examples of the method, apparatuses, and non-transitory computer-readable medium described herein may further include operations, features, means, or instructions for receiving, from the second device, second control signaling indicating assistance information associated with the channel access procedure and where performing the channel access procedure may be further based on the second control signaling indicating assistance information.

Some examples of the method, apparatuses, and non-transitory computer-readable medium described herein may further include operations, features, means, or instructions for determining a channel access duration associated with the channel access procedure based on the assistance information and where performing the channel access procedure may be further based on the channel access duration.

Some examples of the method, apparatuses, and non-transitory computer-readable medium described herein may further include operations, features, means, or instructions for determining a duration of a contention occasion associated with the channel access procedure based on the assistance information and where determining the channel access duration associated with the channel access procedure may be based on the duration of the contention occasion.

Some examples of the method, apparatuses, and non-transitory computer-readable medium described herein may further include operations, features, means, or instructions for determining hybrid automatic repeat request feedback associated with the communications between the second device and the third device based on the assistance information and where determining the duration of the contention occasion associated with the channel access procedure may be further based on the hybrid automatic repeat request feedback.

Some examples of the method, apparatuses, and non-transitory computer-readable medium described herein may further include operations, features, means, or instructions for determining an energy detection threshold based on the assistance information and where performing the channel access procedure may be further based on the energy detection threshold.

Some examples of the method, apparatuses, and non-transitory computer-readable medium described herein may further include operations, features, means, or instructions for determining a configuration for sensing one or more beams in one or more beams directions associated with the channel access procedure based on the assistance information and where performing the channel access procedure may be further based on the configuration for sensing the one or more beams in the one or more beams directions associated with the channel access procedure.

In some examples of the method, apparatuses, and non-transitory computer-readable medium described herein, the first control signaling includes the assistance information and a listen-before-talk (LBT) request associated with the channel access procedure, the channel access procedure including an LBT procedure.

In some examples of the method, apparatuses, and non-transitory computer-readable medium described herein, the first control signaling and the second control signaling may be received from a control node or a scheduling node.

In some examples of the method, apparatuses, and non-transitory computer-readable medium described herein, the first control signaling and the second control signaling may be received during a previous COT, the previous COT initiated by the first device or the second device.

In some examples of the method, apparatuses, and non-transitory computer-readable medium described herein, the first control signaling and the second control signaling may be transmitted over an unshared radio frequency spectrum.

In some examples of the method, apparatuses, and non-transitory computer-readable medium described herein, the first control signaling and the second control signaling includes one or more of a DCI, a MAC-CE, an RRC message, or a sidelink control information (SCI) message.

DETAILED DESCRIPTION

Figure 1:
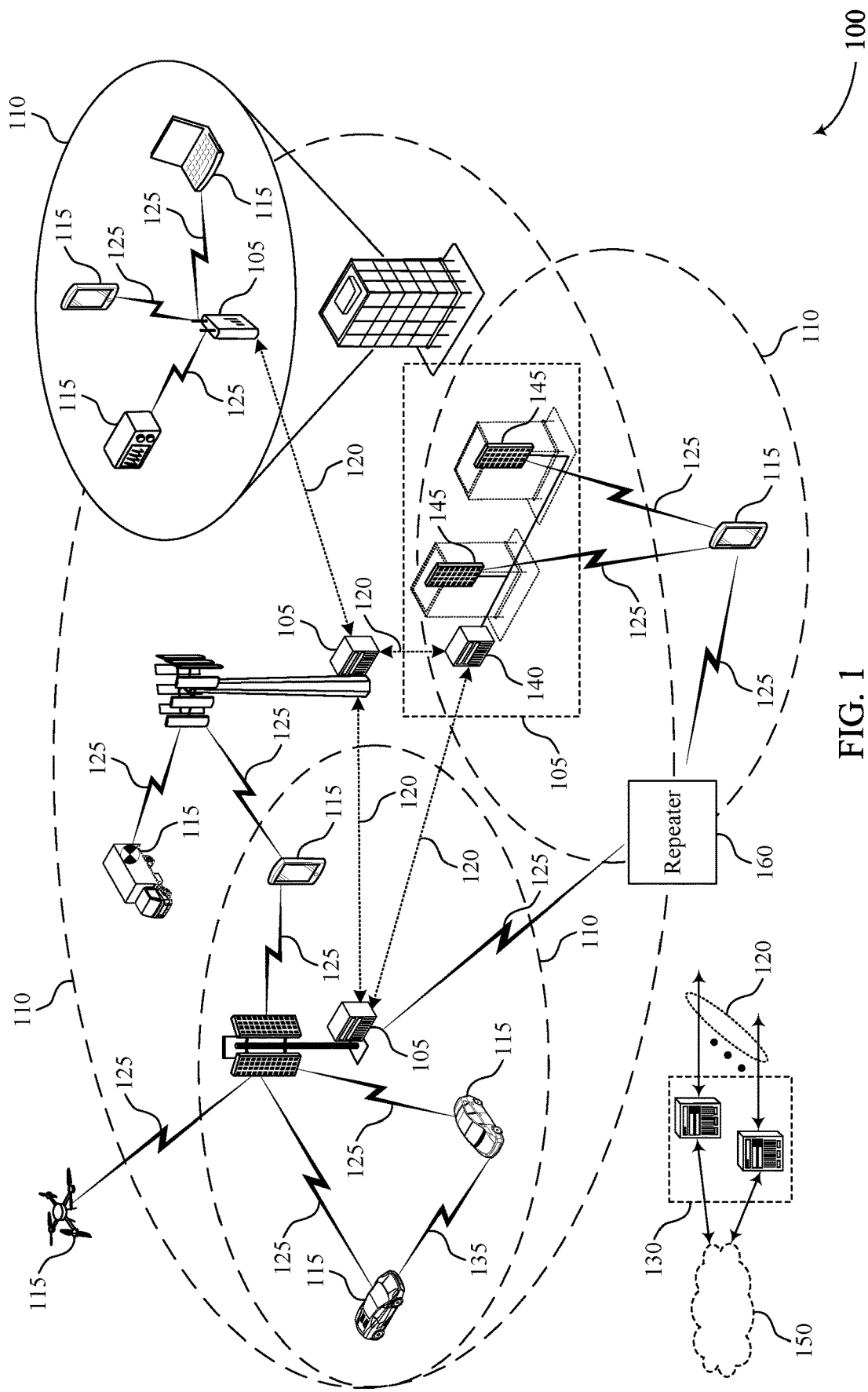
FIGS. 1 and 2 illustrate examples of wireless communications systems that support repeater initiated COT for shared radio frequency spectrum in accordance with aspects of the present disclosure.

A wireless communications system may be configured to support multiple-input, multiple-output (MIMO) communications at various frequency bands to enable increased throughput within the wireless communications system. Some communication devices (e.g., UEs and base stations) of the wireless communications system may support beamforming in order to improve signal reliability and efficiency for MIMO communications. In some cases, a beamformed link between a UE and a base station may be impacted by external factors, such as a physical blocking object, signal fading, or other phenomena. To support MIMO communications in the presence of such external factors, the wireless communications system may use additional wireless nodes (e.g., devices) that may be configured to route communications such that the external factors are limited or avoided.

A communication device may include active antenna units (AAUs) or repeaters (also referred to as repeater devices), and such communication devices may include active antennas and the supporting radio frequency circuitry. Repeater devices may receive one or more signals (e.g., wireless communications) from a transmitting device (e.g., a UE or a base station) and retransmit the wireless communications to a receiving device (e.g., a UE or a base station). In some cases, the wireless communications may be transmitted over an unlicensed (shared) radio frequency spectrum. In such cases, the transmitting device may perform a channel access procedure, such as listen-before-talk (LBT), to gain access to the channel during a duration known as a channel occupancy time (COT). In some cases, upon successfully completing the LBT procedure, the transmitting device may share information about the COT with the repeater device by transmitting a COT sharing indication (e.g., a channel occupancy indication) to the repeater device. In such cases, the repeater device may perform a shortened LBT procedure to utilize the shared COT. However, because the transmitting device initiated the COT, the repeater device may transmit communications to the transmitting device and may not transmit communications to the receiving device. Thus, in such examples, the repeater device may not effectively relay communications between the transmitting device and the receiving device.

Various aspects of the present disclosure relate to enabling a communication device, such as a repeater device, to initiate a channel occupancy. For example, a repeater device may perform a channel access procedure (e.g., an LBT procedure) based on receiving a channel access request (e.g., an LBT request) from a transmitting device (e.g., a base station). In some cases, the repeater device may then, based on successfully completing the LBT procedure, transmit an indication of the repeater initiated channel occupancy to the transmitting device. In some cases, the indication may include an expected time duration for the channel occupancy (i.e., a COT). In such cases, because the repeater device initiated the channel occupancy, the repeater device may effectively relay wireless communications between the transmitting device and the receiving device (e.g., a UE) during the COT. In some instances, the repeater device may terminate the COT based on the COT ending and, in some other cases, the repeater device may terminate the COT based on receiving a COT stopping indication from the transmitter device. For example, the repeater device may receive, from the transmitter device, a bit to stop the COT.

Additionally, the repeater device may enable or disable the LBT procedure based on receiving control signaling (e.g., an LBT request) from the transmitting device. In some cases, the repeater device may also determine, based on receiving the LBT request, a time-domain behavior (e.g., a timing offset or a periodicity) associated with the repeater initiated channel occupancy, a max duration for the repeater initiated COT, one or more resources for transmitting the channel occupancy indication, or an LBT type. Additionally, or alternatively, the repeater device may determine a time duration for the LBT procedure based on receiving assistance information from the transmitting device. In some cases, the repeater device may also determine, based on receiving the assistance information, feedback associated with wireless communications transmitted during the COT, an energy detection threshold, or a configuration for sensing beams in one or more directions during the LBT procedure.

Aspects of the present disclosure may support improvements in wireless communications systems by enabling repeater initiated COT for shared radio frequency spectrum. For example, by enabling repeater initiated COT for shared radio frequency spectrum, communication devices may support higher data rates, thereby improving latency and reliability. Additionally, by enabling repeater initiated COT for shared radio frequency spectrum, communication devices may experience improved network operations, and, in some examples, may promote network efficiencies, among other benefits.

Aspects of the disclosure are initially described in the context of wireless communications systems. Aspects of the disclosure are further illustrated by and described with reference to process flows, apparatus diagrams, system diagrams, and flowcharts that relate to repeater initiated COT for shared radio frequency spectrum.

FIG. 1 illustrates an example of a wireless communications system 100 that supports repeater initiated COT for shared radio frequency spectrum in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or an NR network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, MIMO communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support one or more aspects of repeater initiated COT for shared radio frequency spectrum. For example, a first communication device (e.g., a repeater 160) may receive, from a second communication device (e.g., a base station 105 or a UE 115), control signaling triggering a channel access procedure at the repeater 160. In some case, the channel access procedure may be for accessing a shared radio frequency spectrum. The repeater 160 may then perform the channel access procedure based on the control signaling. In some examples, the repeater 160 may, based on the channel access procedure, transmit an indication of a channel occupancy initiated by the repeater 160 to the second communication device. In some cases, the repeater 160 may relay communications between the second communication device and a third communication device (e.g., another base station 105 or another UE 115) during a COT based on the transmitted indication of the channel occupancy initiated by the repeater 160.

Figure 2:
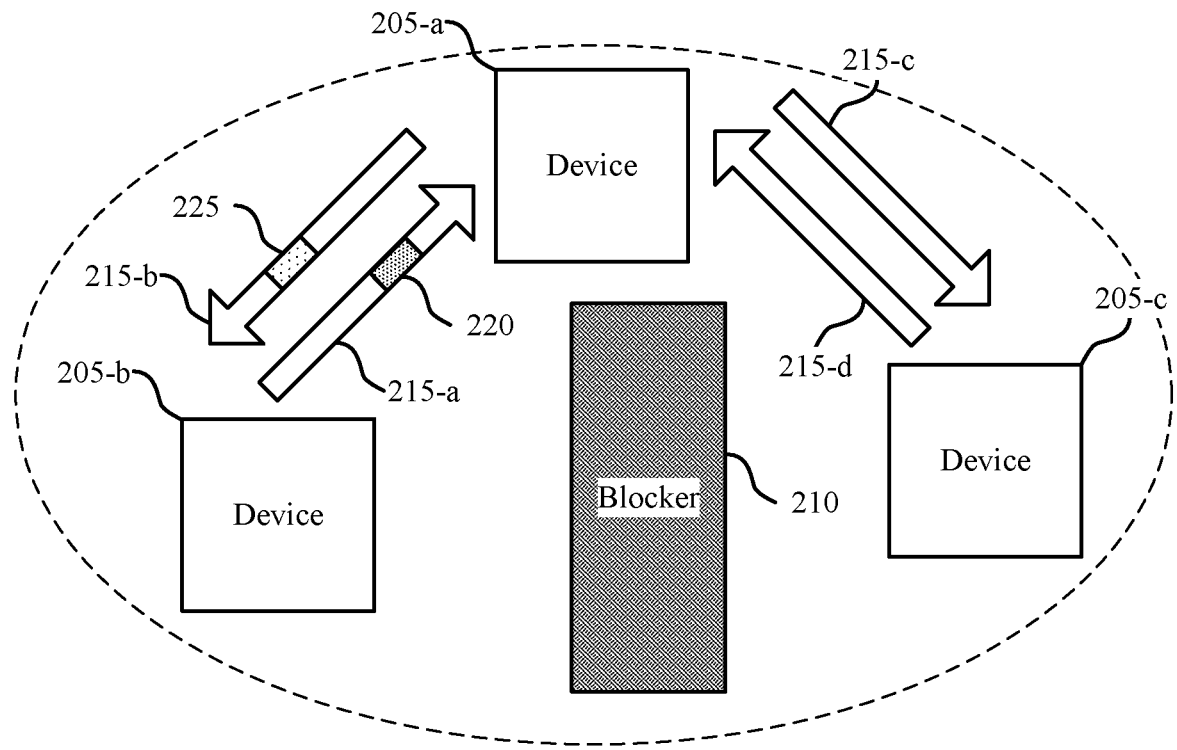

FIG. 2 illustrates an example of a wireless communications system 200 that supports repeater initiated COT for shared radio frequency spectrum in accordance with aspects of the present disclosure. The wireless communications system 200 may implement or be implemented by one or more aspects of the wireless communications system 100. For example, the wireless communications system 200 may include a device 205-b and a device 205-c, which may be examples of devices as discussed with reference to FIG. 1.

In the example of FIG. 2, the device 205-*b* may be a transmitting communication device (e.g., a base station 105 or a UE 115), while the device 205-*c* may be a receiving communication device (e.g., a base station 105 or a UE 115). The device 205-*b* and the device 205-*c* may support wired or wireless communications within a geographic coverage area 110-*a* which may be an example of a geographic coverage area 110 described with reference to FIG. 1.

The wireless communications system 200 illustrates communications between the device 205-*b* and the device 205-*c* in the presence of a blocker 210. In the absence of the blocker 210, the device 205-*b* may directly transmit signals to the device 205-*b*. However, because the direct path between the device 205-*b* and the device 205-*c* may be obstructed by the blocker 210, the device 205-*b* may be unable to directly transmit signals to the device 205-*c*. The blocker 210 may represent a physical obstruction, signal fading, or any other phenomenon or combination of phenomena that may cause communications between the device 205-*b* and the device 205-*c* to experience signal loss or interference. In this example, the blocker 210 may be a physical obstruction (e.g., buildings, mountains, people, etc.) positioned such that direct communications between the device 205-*b* and the device 205-*c* may be impacted, such as by experiencing signal loss or interference. Signal loss or interference may be determined by the network, the device 205-*b*, the device 205-*c*, or any combination thereof. Additionally, it should be understood that the implementations described herein may be applicable with or without the blocker 210. In some cases, to correct signal loss or to otherwise improve the efficiency or reliability of the wireless connection between a transmitting device (e.g., the device 205-*b*) and a receiving device (e.g., the device 205-*c*), the device 205-*b* may utilize additional wireless devices, such a repeater device (e.g., a device 205-*a*), to extend coverage and enhance communications with the device 205-*c*.

For example, the device 205-*b* may extend coverage and enhance communications with the device 205-*c* through the use of active devices, such as repeater devices. In some examples, a repeater device may be a relay device that performs amplify-and-forward (AF) operations to relay communications between two or more wireless devices (e.g., a base station and a UE). In some other examples, a repeater device may be a relay device that performs decode-and-forward operations (e.g., an integrated access and backhaul (IAB) device). Some examples of a repeater device may include a smart repeater device and a traditional repeater device. A smart repeater device may be a repeater device configured with side information. In some cases, side information may include timing (e.g., slot or symbol boundary) information, on-off scheduling information, spatial information for beam management, TDD information (e.g., uplink TDD information or downlink TDD information), or a combination thereof. In some cases, a smart repeater device may be an autonomous smart repeater device where side information may be acquired by the repeater device via receiving (e.g., and decoding) broadcast channel messages. In some other cases, a smart repeater device may be a network-controlled smart repeater device where side information may be configured (e.g., and controlled) by a network control device (e.g., a base station) via an established control interface.

The device 205-*a* may transmit communications to the device 205-*b* via a communication link 215-*b* and to the device 205-*c* via a communication link 215-*c*. Additionally, the device 205-*b* may transmit communications to the device 205-*a* via a communication link 215-*a* and the device 205-*c* may transmit communications to the device 205-*a* via a communication link 215-*d*. In some cases, the communications may be transmitted over a shared radio frequency spectrum. In such cases, the transmitting communication device may perform a channel access procedure (e.g., clear channel assessment (CCA) procedure) before using a channel. For example, a device may perform a CCA procedure (e.g., an LBT procedure) to gain access to the channel during a COT. Stated alternatively, a device may perform an LBT procedure to check (e.g., determine based on energy detection) whether a channel may be occupied. For example, a device may determine a channel to be occupied if the energy level in the channel exceeds a threshold.

LBT procedures may be categorized based on criteria associated with the transmission for which the LBT procedure may be performed. For example, prior to transmitting on a channel, a device may perform an LBT procedure (e.g., a Cat-1 LBT, a Cat-2 LBT, a Cat-3 LBT, or a Cat-4 LBT) and the LBT procedure performed may depend on criteria satisfied by the transmission. For example, in some cases, a transmission may occur over a sub-6 GHz band with a transmission gap of 16 microseconds (µs) and a duration less than 584 µs. In such cases, a Cat-1 LBT may be performed. In some other cases, a transmission may occur over a 60 GHz band with a total duration less than 10 ms and within a 100 ms observation period. In such cases, a Cat-1 LBT (e.g., a Type 2C channel sensing procedure) may also be performed. In some examples, a Cat-1 LBT may correspond to the lack of an LBT procedure. For example, if a transmission satisfies the criteria associated with a Cat-1 LBT, the device may refrain from performing an LBT procedure and may transmit. In some instances, a Cat-1 LBT may be used for backhaul communications in a fixed network.

A transmission (e.g., a synchronization signal block (SSB) transmission) may occur over a sub-6 GHz band with a duration less than or equal to 1 ms and a duty cycle of $\frac{1}{20}$. In such examples, a Cat-2 LBT may be performed. In some other examples, a device may perform a Cat-2 LBT in response to receiving a channel occupancy indication, for example to transmit during a COT initiated by another device. In some cases, the LBT procedure may be successful. In such cases, the device may use the channel for the duration of the COT. In some other cases, the LBT procedure may not be successful. In such cases, the device may not use any portion of the COT. In some cases, a Cat-2 LBT may correspond to a channel sensing procedure (e.g., a type 2A channel sensing procedure or type 2B channel sensing procedure) with a fixed (e.g., 25 µs or 16 µs) sensing window duration.

In some examples, a transmission may occur over a 60 GHz band. In such examples, a Cat-3 LBT may be performed. In some cases, a Cat-3 LBT may correspond to a channel sensing procedure (e.g., a predefined CCA) with a random backoff and a fixed contention window size. For example, a device may select a random number (e.g., an initial value for a counter) from a fixed size contention window and start a countdown from the randomly selected number. In some cases, a channel busy may occur during the countdown (e.g., the channel may be occupied), and the device may hold the counter. In some cases, the device may release the counter and resume the countdown after the channel busy ends. Therefore, in some cases, the duration of the channel sensing procedure may be random.

In some examples, a transmission may occur over a sub-6 GHz band. In such cases, a Cat-4 LBT may be performed. In some cases, a Cat-4 LBT may correspond to a channel sensing procedure (e.g., a Type 1 channel sensing procedure)

with a random back off and a variable contention window size. For example, a device may select a random number (e.g., an initial value for a counter) from a variable size contention window and start a countdown from the randomly selected number. In some cases, the contention window size may depend on feedback (e.g., acknowledgement (ACK) feedback or negative acknowledgment (NACK) feedback) transmitted between a transmitting device (e.g., a base station or a UE) and a receiving device (e.g., another base station or another UE). For example, the contention window size may depend on the percentage of NACK feedback values relative to the percentage of ACK feedback values. In some cases, a channel busy may occur during the countdown (e.g., the channel may be occupied), the device may hold the counter. In some cases, the device may release the counter and resume the countdown after the channel busy ends. Therefore, in some cases, the duration of the channel sensing procedure may be random.

In some examples (e.g., for sub-6 GHz band transmissions), a device may perform a load-based LBT. In some cases, a load-based LBT may be initiated by a base station or a UE (e.g., for a Type-1 Cat-4 LBT). In some other cases, a load-based LBT may be performed in response to receiving a COT sharing indication. For example, a receiving (e.g., responding) device may share a COT initiated by a transmitting device by performing a Type 2 Cat-2 LBT in response to receiving a COT sharing indication from the transmitting device. Stated alternatively, a COT may be shared with a responding device through a Type 2 Cat-2 LBT. Additionally or alternatively, for sub-6 GHz band transmissions, a device may perform a frame-based LBT. In some cases, a transmitting device (e.g., a base station) may initiate a frame-based LBT by configuring a device with a frame structure. In some instances, the frame structure may be periodic. In such instances, the base station may only perform channel sensing during an idle window (e.g., a window when the channel may be idle). In some other cases, a frame-based LBT may occur during a COT shared between a transmitting device (e.g., the base station) and a receiving device (e.g., a UE). In some other examples (e.g., for 60 GHz band transmissions), a device may perform a Cat-3 LBT procedure. In some cases, the Cat-3 LBT procedure may include an initial counter value which ranges from 0 to 3, a COT duration less than 5 ms, an initial deferral of 8 μs, or a sensing slot of 5 μs. Additionally, in some cases, there may be no gap between the transmissions to maintain the COT.

In some cases, upon successfully completing an LBT procedure, the transmitting device may share information about the COT with a repeater device by transmitting a COT sharing indication (e.g., a channel occupancy indication) to the repeater device. In such cases, for example, the repeater device may perform a shortened LBT procedure (e.g., a Cat-1 LBT or a Cat-2 LBT) to utilize the shared COT. However, because the transmitting device initiated the COT, the repeater device may transmit communications to the transmitting device and may not transmit communications to the receiving device. In another example, the repeater device may perform an extended LBT procedure (e.g., a Cat-3 LBT or a Cat-4 LBT). However, because the duration of Cat-3 and Cat-4 procedures may be random, a latency associated with transmissions by the repeater device may be introduced. As such, utilization of the COT may be reduced. Thus, in such examples, the repeater device may not effectively relay communications between the transmitting device and the receiving device.

In some examples, a repeater device with AF operations may be both a transmitter device and a receiver device. Therefore, after successfully completing an LBT procedure, the repeater device may share the repeater initiated COT with one or more other devices (e.g., a transmitting device and a receiving device). As such, within the duration of the repeater initiated COT, the transmitting device (e.g., a base station or a UE) may transmit to the repeater device (e.g., as a responding device for the shared COT) and the repeater device may relay signals (e.g., transmissions) to the receiving device (e.g., another base station or another UE) as the COT initiating device. For example, the repeater device (e.g., the device 205-$a$) may receive control signaling (e.g., control signaling 220) from a transmitting device (e.g., the device 205-$b$). In some cases, the control signaling 220 may trigger a channel access procedure (e.g., an LBT procedure) at the device 205-$a$. In some case, the LBT procedure may be for accessing a shared radio frequency spectrum. The device 205-$a$ may then perform the LBT procedure based on the control signaling 220. In some examples, based on successfully performing the LBT procedure, the device 205-$a$ may transmit an indication (e.g., the channel occupancy indication 225) of the channel occupancy initiated by the device 205-$a$ to the device 205-$b$. In some cases, the device 205-$a$ may then relay communications between the device 205-$b$ and the device 205-$c$ during the COT initiated by the device 205-$a$.

Figure 3:
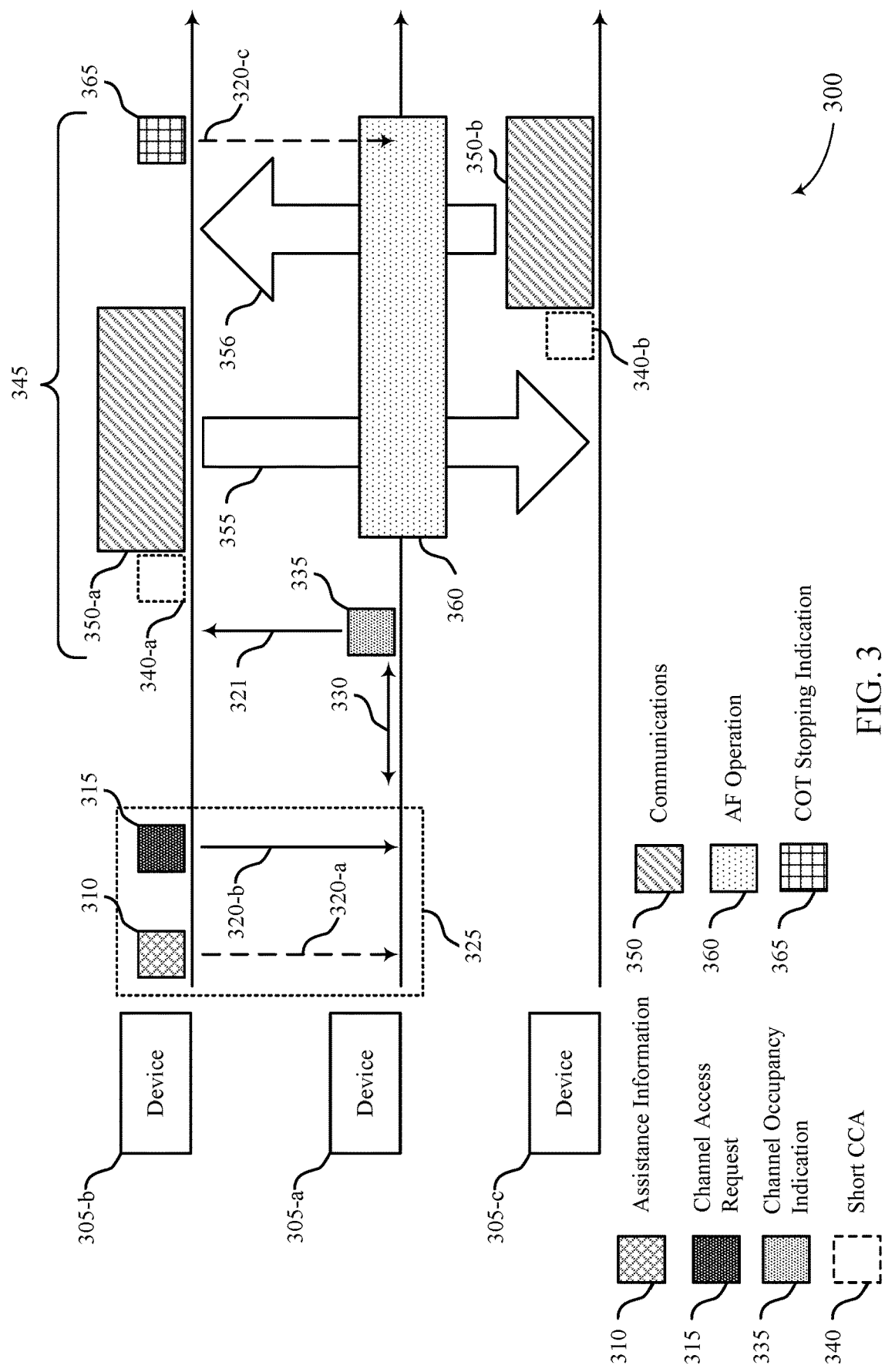
FIGS. 3 through 5 each illustrate examples of process flows that supports repeater initiated COT for shared radio frequency spectrum in accordance with aspects of the present disclosure.

FIG. 3 illustrates an example of a process flow 300 that supports repeater initiated COT for shared radio frequency spectrum in accordance with aspects of the present disclosure. The process flow 300 may implement or be implemented by one or more aspects of the wireless communications system 100. For example, the process flow 300 may include a device 305-$b$ and a device 305-$c$, which may be examples of devices as discussed with reference to FIG. 1. In the example of FIG. 3, the device 305-$b$ may be a transmitting communication device (e.g., a base station 105 or a UE 115), while the device 305-$c$ may be a receiving communication device (e.g., a base station 105 or a UE 115).

In some examples a repeater device (e.g., a device 305-$a$) may relay communications between a transmitting device (e.g., the device 305-$b$) and a receiving device (e.g., the device 305-$c$). In some cases, the transmitting device may be referred to as a scheduling node and the receiving device may be referred to as a scheduled node. In some examples, the device 305-$a$ may start a channel access procedure (e.g., an LBT procedure) to initiate a COT based on a previously received channel access request (e.g., a channel access request 315) from the device 305-$b$. For example, the device 305-$a$ may perform an LBT procedure (e.g., a Cat3 LBT or a Cat 4 LBT) during the time period 330 after receiving the channel access request 315. In some examples, based on successfully completing the LBT procedure, the device 305-$a$ may transmit a COT sharing indication (e.g., a channel occupancy indication 335) to the device 305-$b$ via the communication link 321.

A channel occupancy indication (e.g., the channel occupancy indication 335) may indicate a channel occupancy initiated by the device 305-$a$. Additionally or alternatively, the channel occupancy indication 335 may indicate an expected time duration in which the channel may be occupied (e.g., an expected COT). In response to receiving the channel occupancy indication 335, the device 305-$b$ may transmit to the device 305-$c$ via the device 305-$a$. In some examples, the device 305-$b$ may perform a short channel access procedure (e.g., a short CCA 340-$a$) prior to transmitting. In some cases, the short CCA 340-$a$ (e.g., and the short CCA 340-*b*) may be shorted LBT procedures, such as a Cat-1 LBT or a Cat-2 LBT. For example, in one case, the device 305-*b* may perform a Cat-1 LBT procedure prior to transmitting to the device 305-*c* via the device 305-*a*. Stated alternatively, the device 305-*b* may transmit to the device 305-*c* via the device 305-*a* without performing an LBT procedure. In another case, the device 305-*b* may transmit to the device 305-*c* via the device 305-*a* after successfully performing an LBT procedure (e.g., a Type 2A or Type 2B Cat-2 LBT procedure). In such cases, the device 305-*b* may transmit to the device 305-*c* via the device 305-*a* within the duration of the COT initiated by the device 305-*a* (e.g., the COT 345). Stated alternatively, the scheduling node may transmit to the scheduled node via the repeater device within the repeater initiated COT.

In some examples, the device 305-*b* may transmit control signaling (e.g., a downlink control information (DCI)) to the device 305-*c* via the device 305-*a*. In some cases, the control signaling may carry information regarding the COT 345. In some cases, the device 305-*c* may perform a short channel access procedure in response to receiving the control signaling. For example, the device 305-*c* may perform the short CCA 340-*b* prior to transmitting communications to the device 305-*b* via the device 305-*a*. As such, in some cases, the device 305-*c* may transmit to the device 305-*b* via the device 305-*a* without performing an LBT procedure and, in some other cases, the device 305-*c* may transmit to the device 305-*b* via the device 305-*a* after successfully performing a Cat-2 LBT procedure within the COT 345. Stated alternatively, the scheduled node may transmit to the scheduling node via the repeater device within the repeater initiated COT. In some instances, the device 305-*c* may transmit to the device 305-*b* via the device 305-*a* based on receiving a scheduling grant or, for example, a DCI.

In some examples, the device 305-*a* may start one or more AF operations (e.g., an AF operation 360) after transmitting the channel occupancy indication 335. In some cases, the AF operation 360 may be performed based on TDD information acquired by the device 305-*a*. In some examples, based on the TDD information, the device 305-*a* may determine whether to perform AF operations (e.g., the AF operation 360) from the device 305-*a* to the device 305-*c* (e.g., via downlink 355) or from the device 305-*c* to the device 305-*b* (e.g., via uplink 356) for a period of time. In some cases, the TDD information may be unavailable to the device 305-*a*. In such cases, the device 305-*a* may perform bi-directional AF operations.

The start time of the AF operation at the device 305-*a* (e.g., the AF operation 360) and the start time of transmissions from the device 305-*b* (e.g., communications 350-*a*) may be aligned based on the channel occupancy indication 335. For example, the channel occupancy indication 335 may include a timing offset from the communications 350-*a* to the channel occupancy indication 335. In some examples, the COT may end based on a maximum allowed value, the channel access request 315, or after receiving a COT stopping indication (e.g., a COT stopping indication 365) from the device 305-*b*. In some cases, the COT stopping indication 365 may be transmitted from the device 305-*b* to the device 305-*a* via a communication link 320.

A channel occupancy indication (e.g., the channel occupancy indication 335) may be a signal including one or multiple candidate preamble sequences. In some cases, the signal may span one symbol, a fraction of a symbol (e.g., with a larger subcarrier spacing), or may use multiple time-domain repeated signals within one symbol (e.g., may use an interleaved frequency division multiple access (IF-DMA) structure). In some cases, the signal may be generated prior to transmitting one or more other signals, or after performing an LBT procedure. In some instances, the channel occupancy indication 335 may be detected by the device 305-*b* with small latency. In some cases, multiple candidate preamble sequences may convey information regarding multiple remaining COT durations that may be shared with one or more other devices (e.g., the device 305-*c*). In some cases, the signal may be scrambled with an identifier associated with the device 305-*a* (e.g., a repeater device ID) to differentiate the device 305-*a* from other device 305 (e.g., other repeater devices).

In some other examples, the channel occupancy indication 335 may be a control message. For example, the channel occupancy indication 335 may be an uplink control information (UCI) transmitted over a physical uplink control channel (PUCCH) or a physical uplink shared channel (PUSCH), a DCI transmitted over a physical downlink control channel (PDCCH) or a physical downlink shared channel (PDSCH), or the channel occupancy indication 335 may be a medium access control-control element (MAC-CE) or a radio resource control (RRC) message. In some other cases, the channel occupancy indication 335 may be a sidelink control information (SCI) message. In some cases, the channel occupancy indication 335 may be associated with a time window, and candidate resources for transmission of the indication may be allocated within the time window. For example, a repeater device may successfully complete an LBT procedure within the time window. In such an example, the repeater device may transmit the channel occupancy indication 335, using the next candidate resource. In some cases, the remaining candidate resources within the window may then be deactivated. In another example, the repeater device may not successfully complete an LBT procedure within the time window. In such an example the device 305-*a* may not transmit the channel occupancy indication 335 and, as such, the LBT procedure may be determined to be a failure.

In some examples, the device 305-*b* may transmit (e.g., via control signaling), to the device 305-*a*, a channel access request message (e.g., the channel access request 315) that may indicate information associated with the repeater initiated COT (e.g., the COT 345). For example, in some cases, the channel access request 315 may indicate whether the device 305-*a* may enable or disable the COT 345. In some other cases, the channel access request 315 may indicate a maximum duration for the COT, one or more resources for transmitting the channel occupancy indication 335, an LBT type (e.g., Cat-1, Cat-2, Cat-3, or Cat-4), or scheduling information (e.g., time-domain behavior information) associated with the COT 345. In some cases, the channel access request 315 may be used to indicate an LBT procedure for a single COT. In such cases, the scheduling information may include a timing offset associated with the COT (e.g., a timing offset to an expected COT or a timing offset to a start of the LBT procedure). In some other cases, the channel access request 315 may be used to indicate an LBT procedure for periodic (e.g., or semi-persistent scheduling) COTs.

For example, COTs for periodic (e.g., or semi-persistent scheduling) channel allocations such as SSB, physical random access channel (PRACH) transmissions, periodic CSI-RS, SRS, configured-grant PSUCH, SPS PDSCH, or SPS PUSCH. In such cases, the scheduling information may include a periodicity associated with the COT and a timing offset associated with the COT (e.g., a timing offset to an expected COT or a timing offset to a start of the LBT procedure). In yet some other cases, the channel access request 315 may be used to indicate an LBT procedure for multiple COTs. In some examples, the multiple COTs may occur based on a pattern, over a time period, or until the device 305-a receives a message to disable repeater initiated COTs. In such cases, the scheduling information may include a number of expected COTs, one or more patterns of time windows (e.g., to perform an LBT procedure), or one or more occasions within which an LBT procedure may be completed for an expected COT. The one or more patterns may be based on a known (e.g., known to the device 305-a) traffic pattern, a predicted traffic pattern, a pattern of channel allocation (e.g., a SSB pattern), or a pattern that may indicate the start of the LBT procedure to occur during a COT subsequent to the end of a previous COT (e.g., a previous COT 325). In some cases, one or more patterns may be useful for heavy traffic cases (e.g., downloading files) between the device 305-b and the device 305-c.

In some examples, the device 305-b may transmit (e.g., via control signaling), to the device 305-a, assistance information (e.g., an assistance information 310) associated with the repeater initiated COT (e.g., the COT 345). In some instances, the assistance information 310 and the channel access request 315 may be included in a same control signal or different control signals, which may be transmitted during the previous COT 325 (e.g., via a communication link 320). In some cases, the assistance information 310 may include an initial value of a counter (e.g., for a Cat-4 LBT), a contention window size in which the initial counter value may be generated from, HARQ feedback (e.g., ACK or NACK feedback associated with data communication between the device 305-b and the device 305-c) to determine a contention window size, an energy detection threshold, or a configuration for sensing one or more beam directions (e.g., during an LBT procedure). In some instances, the configuration for sensing one or more beams may include a configuration for sensing all beam directions (e.g., including reception directions and forwarding directions), sensing one or more beam directions related to forwarding directions, or sensing one or more beam directions related to a service side (e.g., one or more directed towards one or more UEs or one or more base stations). In some cases, an LBT procedure may not be required on a front-haul side (e.g., towards one or more base stations with a large number of antennas), for example due to a reduced interference from narrow beams or increased elevation.

Figure 4:
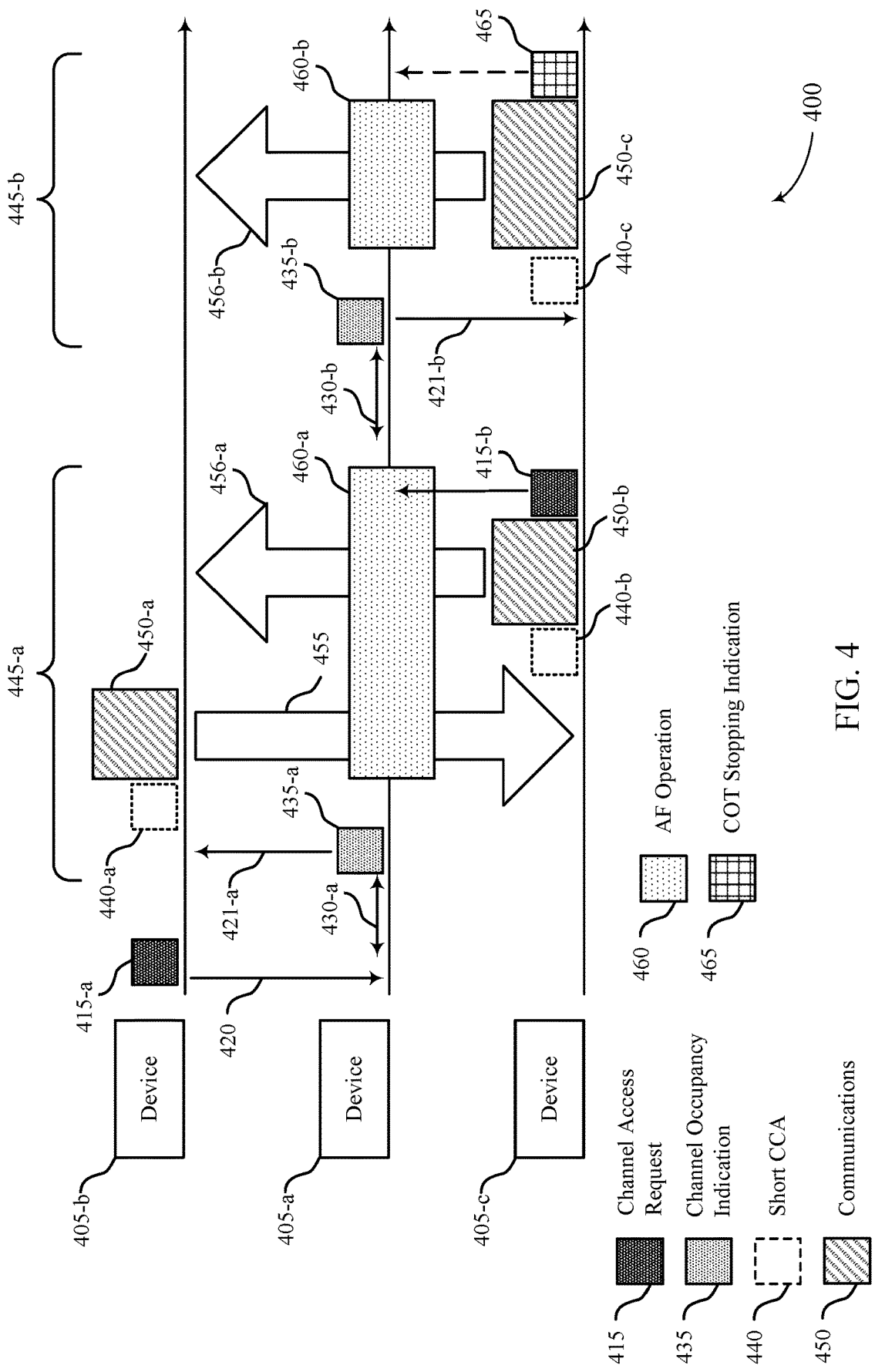

FIG. 4 illustrates an example of a process flow 400 that supports repeater initiated COT for shared radio frequency spectrum in accordance with aspects of the present disclosure. The process flow 400 may implement or be implemented by one or more aspects of the wireless communications system 100. For example, the process flow 400 may include a device 405-b and a device 405-c, which may be examples of devices as discussed with reference to FIG. 1. In the example of FIG. 4, the device 405-b may be a transmitting communication device (e.g., a base station 105 or a UE 115), while the device 405-c may be a receiving communication device (e.g., a base station 105 or a UE 115). The process flow may also include channel access requests 415, communication links 420, communication links 421, time periods 430, channel occupancy indications 435, short CCAs 440, COTs 445, communications 450, a downlink 455, uplinks 456, AF operations 460, and a COT stopping indication 465 which may be examples of the corresponding aspects described with respect to FIG. 3.

A control interface may be supported between a repeater device (e.g., a device 405-a) and a scheduled node (e.g., the device 405-c). For example, a device 405-c may transmit a channel access request (e.g., a channel access request 415-b) to the device 405-a during a repeater initiated COT (e.g., a COT 445-a). In some cases, in response to receiving the channel access request 415-b, the device 405-a may perform a channel access procedure (e.g., an LBT procedure) during a time period 430-b. In some examples, based on performing a successful LBT procedure, the device 405-a may transmit a channel occupancy indication (e.g., a channel occupancy indication 435-b) to the device 405-c. In response, the device 405-c may perform a short channel access procedure (e.g., a short CCA 440). In some cases, the device 405-a may then relay communications (e.g., communications 450-c) from the device 405-c to the device 405-b during the COT 445-b. In some instances, the device 405-a may receive, from the device 405-c, a COT stopping indication 465. In some cases, the device 405-a may stop AF operations in response to receiving the COT stopping indication 465.

Figure 5:
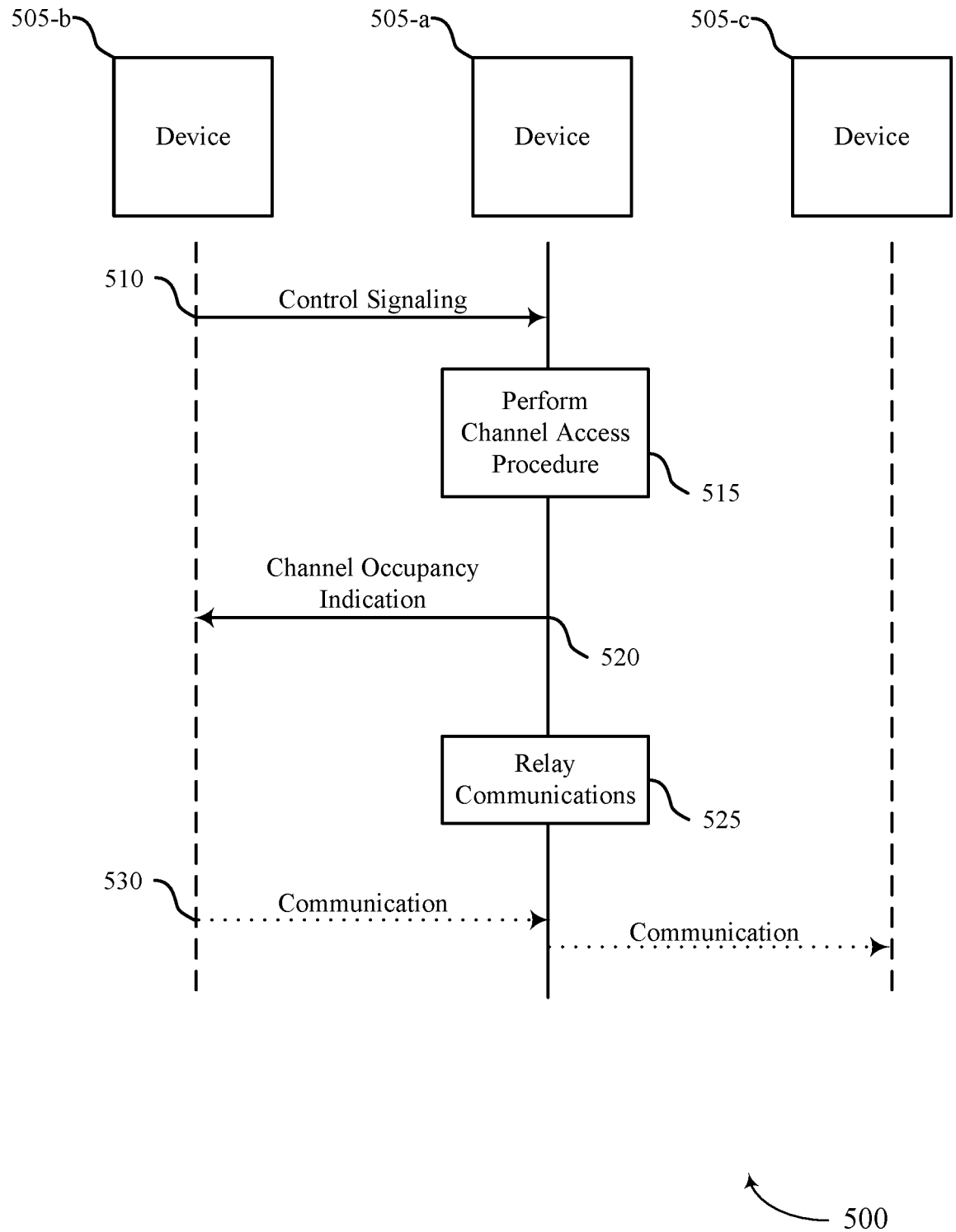

FIG. 5 illustrates an example of a process flow 500 that supports repeater initiated COT for shared radio frequency spectrum in accordance with aspects of the present disclosure. The process flow 500 may implement or be implemented by one or more aspects of the wireless communications system 100 and the wireless communications system 200. For example, the process flow 500 may include a device 505-b and a device 505-c, which may be examples of devices as discussed with reference to FIG. 1. In the example of FIG. 5, the device 505-b may be a transmitting communication device (e.g., a base station 105 or a UE 115), while the device 505-c may be a receiving communication device (e.g., a base station 105 or a UE 115). In the following description of the process flow 500, operations between a device 505-a, the device 505-b, and the device 505-c may occur in a different order or at different times than as shown. Some operations may also be omitted from the process flow 500, and other operations may be added to the process flow 500.

At 510, a repeater device (e.g., the device 505-a) may receive, from a second communication device (e.g., the device 505-b), control signaling triggering a channel access procedure (e.g., an LBT procedure) at the device 505-a. In some case, the channel access procedure may be for accessing a shared radio frequency spectrum. At 515, the device 505-a may then perform the channel access procedure based on the received control signaling.

At 520, the device 505-a may transmit an indication of a channel occupancy initiated by the device 505-a, to the device 505-b based on the channel access procedure. Then, at 525, the device 505-a may relay communications between the device 505-b and the device 505-c during a COT (e.g., the COT imitated by the device 505-a). In some cases, the device 505-a may relay communications based on the transmitted indication of the channel occupancy initiated by the device 505-a. For example, at 530, the device 505-b may transmit communications to the device 505-a, and the device 505-a may relay the communications to the device 505-c.

In a first example, a repeater initiated COT may be used for downlink data traffic. In such an example, the device 505-b may be a base station and the device 505-c may be a UE. For example, based on a downlink buffer status, a device 505-b may transmit control signaling (e.g., an LBT request) to trigger one or more COTs (e.g., repeater initiated COTs) at the device 505-a. In some cases, the device 505-a may start an LBT procedure after receiving the LBT request. In some examples, the device 505-a may transmit a COT sharing indication (e.g., a channel occupancy indication) to the device 505-b after successfully completing the LBT procedure.

The device 505-*a* may then start one or more AF operations at a timing offset after transmission of the channel occupancy indication. In some instances, the device 505-*b* may then start transmitting downlink communications (e.g., PDCCH communications or PDSCH communications) within the repeater initiated COT at the aligned timing offset with device 505-*a*. The device 505-*b* may start transmitting downlink communications after successfully performing an LBT procedure (e.g., a Cat-1 LBT procedure or a Type-2 Cat-2 LBT procedure) in response to receiving the channel occupancy indication. In some examples, traffic (e.g., downlink traffic or uplink traffic) may be completed before the end of a maximum COT duration. In such examples, the device 505-*b* may transmit a COT stopping indication to the device 505-*a*.

In a second example, a repeater initiated COT may be used for uplink data traffic. In such examples, the device 505-*b* may be a base station and the device 505-*c* may be a UE. For example, based on an uplink buffer status report, the device 505-*b* may transmit an LBT request to trigger one or more repeater initiated COTs at the device 505-*a*. In such an example, the device 505-*a* may start an LBT procedure after receiving the LBT request. The device 505-*a* may transmit a channel occupancy indication to the device 505-*a* after successfully completing the LBT procedure. In some instances, the device 505-*a* may then start one or more AF operations at a timing offset after transmission of the channel occupancy indication. The device 505-*a* may transmit control signaling (e.g., a DCI 2.0 or a DCI grant for uplink traffic) at the aligned timing offset with the device 505-*a*.

In some cases, the device 505-*b* may transmit the control signaling after performing an LBT procedure or, in some other cases, after receiving the channel occupancy indication. The control signaling may carry information regarding the repeater initiated COT. For example, after receiving the control signaling, the device 505-*c* may identify the repeater initiated COT. In such an example, the device 505-*c* may start transmitting uplink communications (e.g., PUSCH communications) within the repeater initiated COT. In some cases, the device 505-*c* may start transmitting uplink communications after successfully performing an LBT procedure (e.g., a Cat-1 LBT procedure or a Type-2 Cat-2 LBT procedure) based on the received control signaling.

In a third example, the repeater initiated COT may be used for transmitting SSBs. In such examples, the device 505-*b* may be a base station and the device 505-*c* may be a UE. For example, the device 505-*b* may transmit an LBT request that indicates periodic COTs (e.g., for a set of SSBs) to the device 505-*a*. In such an example, the device 505-*a* may perform an LBT procedure for the periodic COTs indicated by LBT request. The device 505-*a* may transmit a sharing indication to the device 505-*b* after successfully completing the LBT procedure. In some instances the device 505-*a* may then start one or more AF operations at a timing offset after transmitting the channel occupancy indication.

In some examples, a set of SSBs transmitted within a predetermined time window may be referred to as an SSB burst. In some cases, an SSB burst may meet the criteria for a 60 GHz transmission. In such cases, the device 505-*b* may refrain from performing an LBT procedure and may transmit the SSB burst to the device 505-*c* via the device 505-*a* after receiving the channel occupancy indication. In some other cases, the SSB burst may have a duration that is less than or equal to 1 ms and the duty cycle may be ¹⁄₂₀. In such cases, the device may perform an LBT procedure (e.g., a Type-2 Cat-2 LBT procedure) prior to transmitting the SSB burst to the device 505-*c* via the device 505-*a*. The device 505-*b* may transmit the SSB burst within the repeater initiated COT at the aligned timing offset with the device 505-*a*. In some cases, the device 505-*b* may transmit the SSB burst after successfully performing the LBT procedure. In some other cases, the device 505-*b* may refrain from performing an LBT procedure and may transmit the SSB burst after receiving the channel occupancy indication.

In a fourth example, a repeater initiated COT may be used for transmitting one or more PRACH communications. In such examples, the device 505-*b* may be a base station and the device 505-*c* may be a UE. For example, the device 505-*b* may transmit, to the device 505-*a*, an LBT request indicating expected COTs for periodic PRACH communications based on a PRACH configuration. In response, the device 505-*a* may perform an LBT procedure for periodic COTs indicated by the LBT request. In some cases, the device 505-*a* may transmit a channel occupancy indication to the device 505-*b* after successfully performing the LBT procedure. The device 505-*a* may then start one or more AF operations at a timing offset after transmitting the channel occupancy indication.

In some cases, the device 505-*b* may transmit control signaling (e.g., a DCI 2.0) to the device 505-*c* at the aligned timing offset with the device 505-*a*. In some cases, the device 505-*b* may transmit control signaling after successfully performing an LBT procedure (e.g., a type-2 Cat-2 LBT procedure). In some other cases, the device 505-*b* may refrain from performing an LBT procedure and may transmit control signaling after receiving the channel occupancy indication. Upon receiving the control signaling, the device 505-*c* may identify the repeater initiated COT.

In some cases, the device 505-*c* may perform a random access channel (RACH) procedure. In such cases, the device 505-*c* may start transmitting one or more PRACH communications within the repeater initiated COT. In some cases, the device 505-*c* may transmit the one or more PRACH communications based on a PRACH configuration after successfully performing an LBT procedure (e.g., a Type-2 Cat-2 LBT procedure). In some other cases, the device 505-*c* may refrain from performing an LBT procedure any may transmit the one or more PRACH communications after receiving the control signaling.

Figure 6:
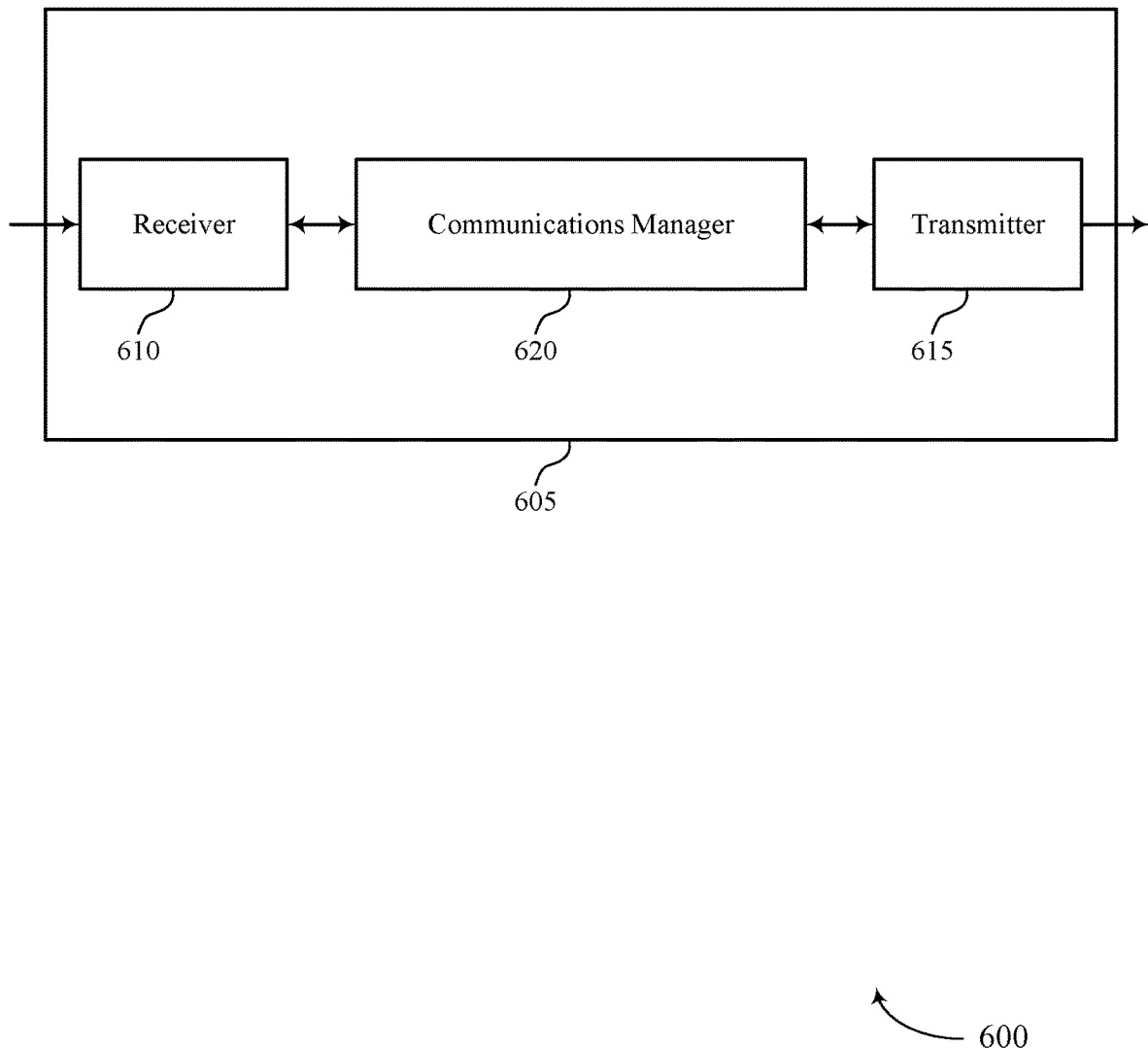
FIGS. 6 and 7 show block diagrams of devices that support repeater initiated COT for shared radio frequency spectrum in accordance with aspects of the present disclosure.

FIG. 6 shows a block diagram 600 of a device 605 that supports repeater initiated COT for shared radio frequency spectrum in accordance with aspects of the present disclosure. The device 605 may be an example of aspects of a repeater 160 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to repeater initiated COT for shared radio frequency spectrum). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to repeater initiated COT for shared radio frequency spectrum). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of repeater initiated COT for shared radio frequency spectrum as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first device (e.g., the device 605) in accordance with examples as disclosed herein. For example, the communications manager 620 may be configured as or otherwise support a means for receiving, from a second device (e.g., a base station 105 or a UE 115), first control signaling triggering a channel access procedure at the device 605, the channel access procedure for accessing a shared radio frequency spectrum. The communications manager 620 may be configured as or otherwise support a means for performing the channel access procedure based on the first control signaling. The communications manager 620 may be configured as or otherwise support a means for transmitting, to the second device, an indication of a channel occupancy initiated by the device 605, based on the channel access procedure. The communications manager 620 may be configured as or otherwise support a means for relaying communications between the second device and a third device (e.g., another base station 105 or another UE 115) during a COT based on the transmitted indication of the channel occupancy initiated by the device 605.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced power consumption and more efficient utilization of communication resources.

Figure 7:
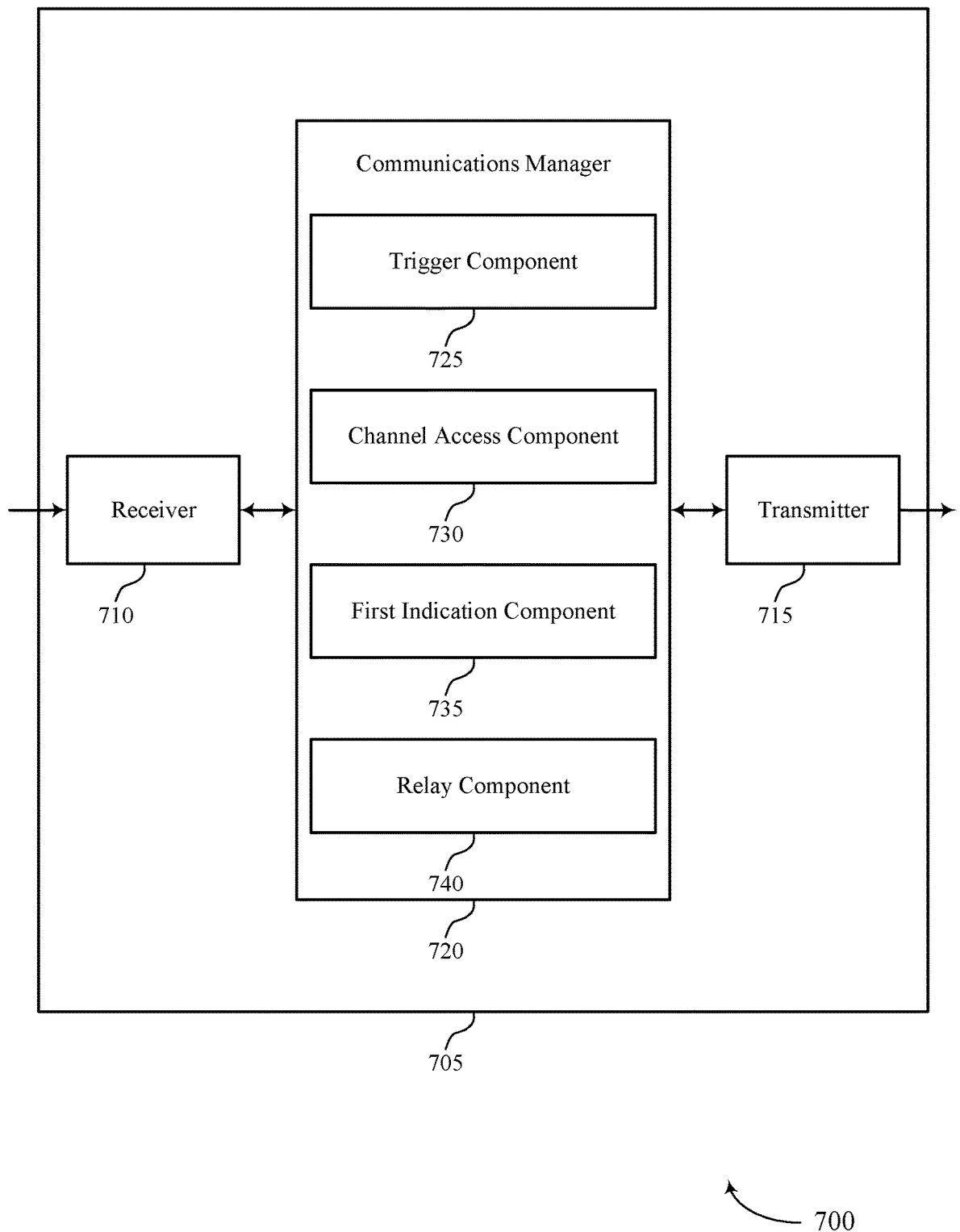

FIG. 7 shows a block diagram 700 of a device 705 that supports repeater initiated COT for shared radio frequency spectrum in accordance with aspects of the present disclosure. The device 705 may be an example of aspects of a device 605 or a repeater device (e.g., a repeater 160) described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to repeater initiated COT for shared radio frequency spectrum). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to repeater initiated COT for shared radio frequency spectrum). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of repeater initiated COT for shared radio frequency spectrum as described herein. For example, the communications manager 720 may include a trigger component 725, a channel access component 730, a first indication component 735, a relay component 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first device (e.g., the device 705) in accordance with examples as disclosed herein. The trigger component 725 may be configured as or otherwise support a means for receiving, from a second device (e.g., a base station 105 or a UE 115), first control signaling triggering a channel access procedure at the first device, the channel access procedure for accessing a shared radio frequency spectrum. The channel access component 730 may be configured as or otherwise support a means for performing the channel access procedure based on the first control signaling. The first indication component 735 may be configured as or otherwise support a means for transmitting, to the second device, an indication of a channel occupancy initiated by the first device, based on the channel access procedure. The relay component 740 may be configured as or otherwise support a means for relaying communications between the second device and a third device (e.g., another base station 105 or another UE 115) during a COT based on the transmitted indication of the channel occupancy initiated by the first device.

Figure 8:
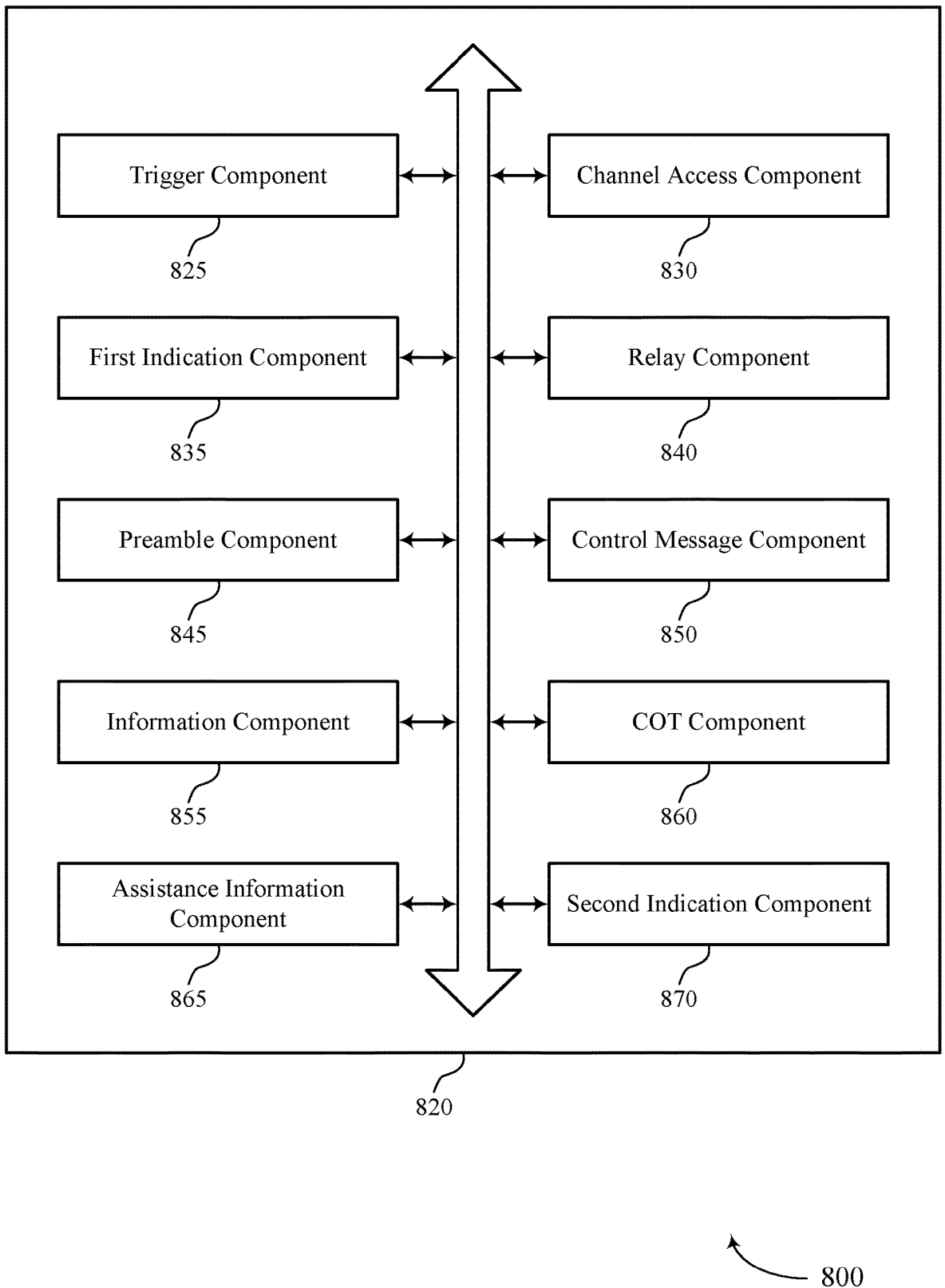
FIG. 8 shows a block diagram of a communications manager that supports repeater initiated COT for shared radio frequency spectrum in accordance with aspects of the present disclosure.

FIG. 8 shows a block diagram 800 of a communications manager 820 that supports repeater initiated COT for shared radio frequency spectrum in accordance with aspects of the present disclosure. The communications manager 820 may be an example of aspects of a communications manager 620, a communications manager 720, or both, as described herein. The communications manager 820, or various components thereof, may be an example of means for performing various aspects of repeater initiated COT for shared radio frequency spectrum as described herein. For example, the communications manager 820 may include a trigger component 825, a channel access component 830, a first indication component 835, a relay component 840, a preamble component 845, a control message component 850, an information component 855, a COT component 860, an assistance information component 865, a second indication component 870, or any combination thereof. Each of these components may communicate, directly or indirectly, with one another (e.g., via one or more buses).

The communications manager 820 may support wireless communication at a first device (e.g., a repeater device) in accordance with examples as disclosed herein. The trigger component 825 may be configured as or otherwise support a means for receiving, from a second device (e.g., a base station 105 or a UE 115), first control signaling triggering a channel access procedure at the first device, the channel access procedure for accessing a shared radio frequency spectrum. The channel access component 830 may be configured as or otherwise support a means for performing the channel access procedure based on the first control signaling. The first indication component 835 may be configured as or otherwise support a means for transmitting, to the second device, an indication of a channel occupancy initiated by the first device, based on the channel access procedure. The relay component 840 may be configured as or otherwise support a means for relaying communications between the second device and a third device (e.g., another base station 105 or another UE 115) during a COT based on the transmitted indication of the channel occupancy initiated by the first device.

In some examples, the relay component 840 may be configured as or otherwise support a means for stopping the relaying of the communications between the second device and the third device based on the COT. In some examples, the second indication component 870 may be configured as or otherwise support a means for receiving, from the second device, a second indication indicating a lapsing of the COT. In some examples, the relay component 840 may be configured as or otherwise support a means for stopping the relaying of the communications between the second device and the third device based on the second indication indicating the lapsing of the COT. In some examples, the lapsing of the COT may refer to an interval or passage of the COT.

In some other examples, the second indication indicating the lapsing of the COT may be a bit indication (e.g., a bit) and refers to stopping of the COT. In other examples, the indication may include extra information, but at a minimum it can be as simple as one bit to stop the COT. In some other examples, the second indication may cover the one-bit indication of termination of the COT without carrying the information about COT interval.

In some examples, the COT component 860 may be configured as or otherwise support a means for determining that the COT satisfies a threshold value. In some examples, the threshold value may indicate a maximum COT. The threshold value may be preconfigured or indicated by the first control signaling triggering the channel access procedure at the first device. In some examples, the relay component 840 may be configured as or otherwise support a means for stopping the relaying of the communications between the second device and the third device based on determining that the COT satisfies the threshold value.

In some examples, to support transmitting the indication of the channel occupancy, the preamble component 845 may be configured as or otherwise support a means for generating a preamble sequence based on a configuration, the preamble sequence identifying the channel occupancy initiated by the first device. In some examples, to support transmitting the indication of the channel occupancy, the preamble component 845 may be configured as or otherwise support a means for transmitting, to the second device, the generated preamble sequence. In some examples, the generated preamble includes one or more of a maximum duration of the COT, or a scrambling between the generated preamble and an identifier associated with the first device. In some examples, to support transmitting the indication of the channel occupancy, the control message component 850 may be configured as or otherwise support a means for transmitting, in a control message over a control channel, the indication of the channel occupancy initiated by the first device, the control message including one or more of an UCI, a DCI, or a MAC-CE. The control channel including one or more of a PUCCH, a PUSCH, a PDCCH, or a PDSCH.

In some examples, the information component 855 may be configured as or otherwise support a means for receiving scheduling information on at least one resource of a set of resources allocated for transmitting, to the second device, the indication of the channel occupancy initiated by the first device. In some examples, the at least one resource corresponds to the at least one occasion. In some examples, the scheduling information is included in the first control signaling. In some examples, the channel access component 830 may be configured as or otherwise support a means for initiating the channel access procedure at the first device based on the first control signaling. In some examples, the channel access component 830 may be configured as or otherwise support a means for performing the channel access procedure based on initiating the channel access procedure at the first device.

In some examples, the channel access component 830 may be configured as or otherwise support a means for determining, based on the first control signaling, one or more of a timing offset associated with the channel access procedure, a periodicity associated with the channel access procedure, a type associated with the channel access procedure, or any combination thereof. In some examples, the channel access component 830 may be configured as or otherwise support a means for performing the channel access procedure is further based on one or more of the timing offset associated with the channel access procedure, the periodicity associated with the channel access procedure, the type associated with the channel access procedure, or any combination thereof. In some examples, the COT component 860 may be configured as or otherwise support a means for determining, based on the first control signaling, one or more of a timing offset associated with the COT, a periodicity associated with the COT, a threshold associated with the COT, one or more resources for indicating the COT, or any combination thereof.

In some examples, the assistance information component 865 may be configured as or otherwise support a means for receiving, from the second device, second control signaling indicating assistance information associated with the channel access procedure. In some examples, the channel access component 830 may be configured as or otherwise support a means for performing the channel access procedure based on the second control signaling indicating assistance information. In some examples, the assistance information component 865 may be configured as or otherwise support a means for determining a channel access duration associated with the channel access procedure based on the assistance information. In some examples, the channel access component 830 may be configured as or otherwise support a means for performing the channel access procedure based on the channel access duration.

In some examples, the assistance information component 865 may be configured as or otherwise support a means for determining a duration of a contention occasion associated with the channel access procedure based on the assistance information. In some examples, the channel access component 830 may be configured as or otherwise support a means for determining the channel access duration associated with the channel access procedure based on the duration of the contention occasion. In some examples, the assistance information component 865 may be configured as or otherwise support a means for determining HARQ feedback associated with the communications between the second device and the third device based on the assistance information. In some examples, the channel access component 830 may be configured as or otherwise support a means for determining the duration of the contention occasion associated with the channel access procedure based on the HARQ feedback.

In some examples, the assistance information component 865 may be configured as or otherwise support a means for determining an energy detection threshold based on the assistance information. In some examples, the channel access component 830 may be configured as or otherwise support a means for performing the channel access procedure based on the energy detection threshold. In some examples, the assistance information component 865 may be configured as or otherwise support a means for determining a configuration for sensing one or more beams in one or more beams directions associated with the channel access procedure based on the assistance information. In some examples, the channel access component 830 may be configured as or otherwise support a means for performing the channel access procedure based on the configuration for sensing the one or more beams in the one or more beams directions associated with the channel access procedure.

In some examples, the first control signaling includes the assistance information and an LBT request associated with the channel access procedure, the channel access procedure including an LBT procedure. In some examples, the first control signaling and the second control signaling are received from a control node or a scheduling node. In some examples, the first control signaling and the second control signaling are received during a previous COT, the previous COT initiated by the first device or the second device. In some examples, the first control signaling and the second control signaling are transmitted over an unshared radio frequency spectrum. In some examples, the first control signaling and the second control signaling includes one or more of a DCI, a MAC-CE, an RRC message, or an SCI message.

Figure 9:
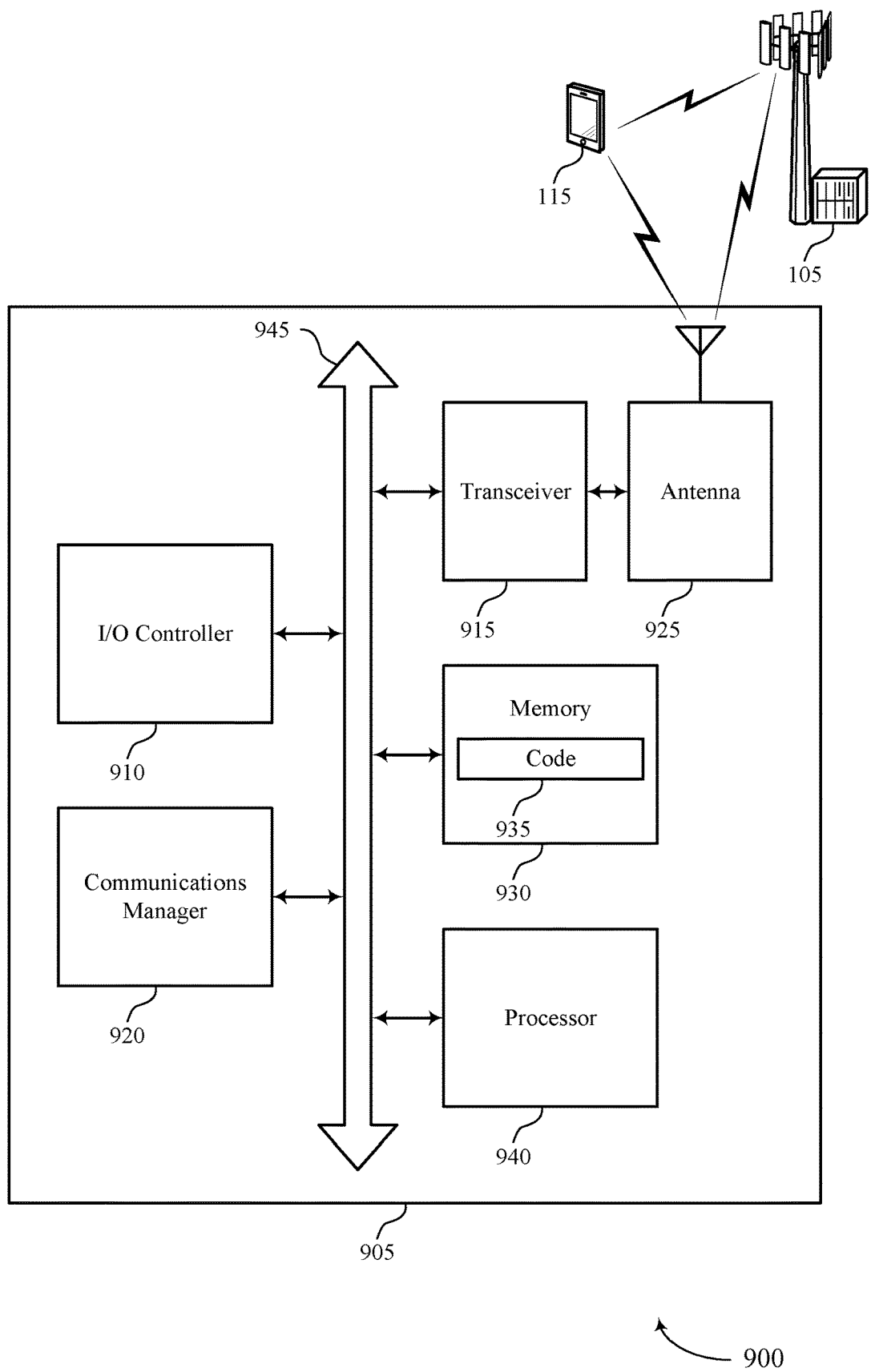
FIG. 9 shows a diagram of a system including a device that supports repeater initiated COT for shared radio frequency spectrum in accordance with aspects of the present disclosure.

FIG. 9 shows a diagram of a system 900 including a device 905 that supports repeater initiated COT for shared radio frequency spectrum in accordance with aspects of the present disclosure. The device 905 may be an example of or include the components of a device 605, a device 705, or a repeater device (e.g., a repeater 160) as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting repeater initiated COT for shared radio frequency spectrum). For example, the device 905 or a component of the device 905 may include a processor 940 and memory 930 coupled to the processor 940, the processor 940 and memory 930 configured to perform various functions described herein.

The communications manager 920 may support wireless communication at a first device (e.g., the device 905) in accordance with examples as disclosed herein. For example, the communications manager 920 may be configured as or otherwise support a means for receiving, from a second device (e.g., a base station 105 or a UE 115), first control signaling triggering a channel access procedure at the first device, the channel access procedure for accessing a shared radio frequency spectrum. The communications manager 920 may be configured as or otherwise support a means for performing the channel access procedure based on the first control signaling. The communications manager 920 may be configured as or otherwise support a means for transmitting, to the second device, an indication of a channel occupancy initiated by the first device, based on the channel access procedure. The communications manager 920 may be configured as or otherwise support a means for relaying communications between the second device and a third device (e.g., another base station 105 or UE 115) during a COT based on the transmitted indication of the channel occupancy initiated by the first device. By including or configuring the communications manager 920 in accordance with examples as described herein, the device 905 may support techniques for improved communication reliability, reduced latency, improved user experience related to reduced processing, more efficient utilization of communication resources, and improved coordination between devices.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of repeater initiated COT for shared radio frequency spectrum as described herein, or the processor 940 and the memory 930 may be otherwise configured to perform or support such operations.

Figure 10:
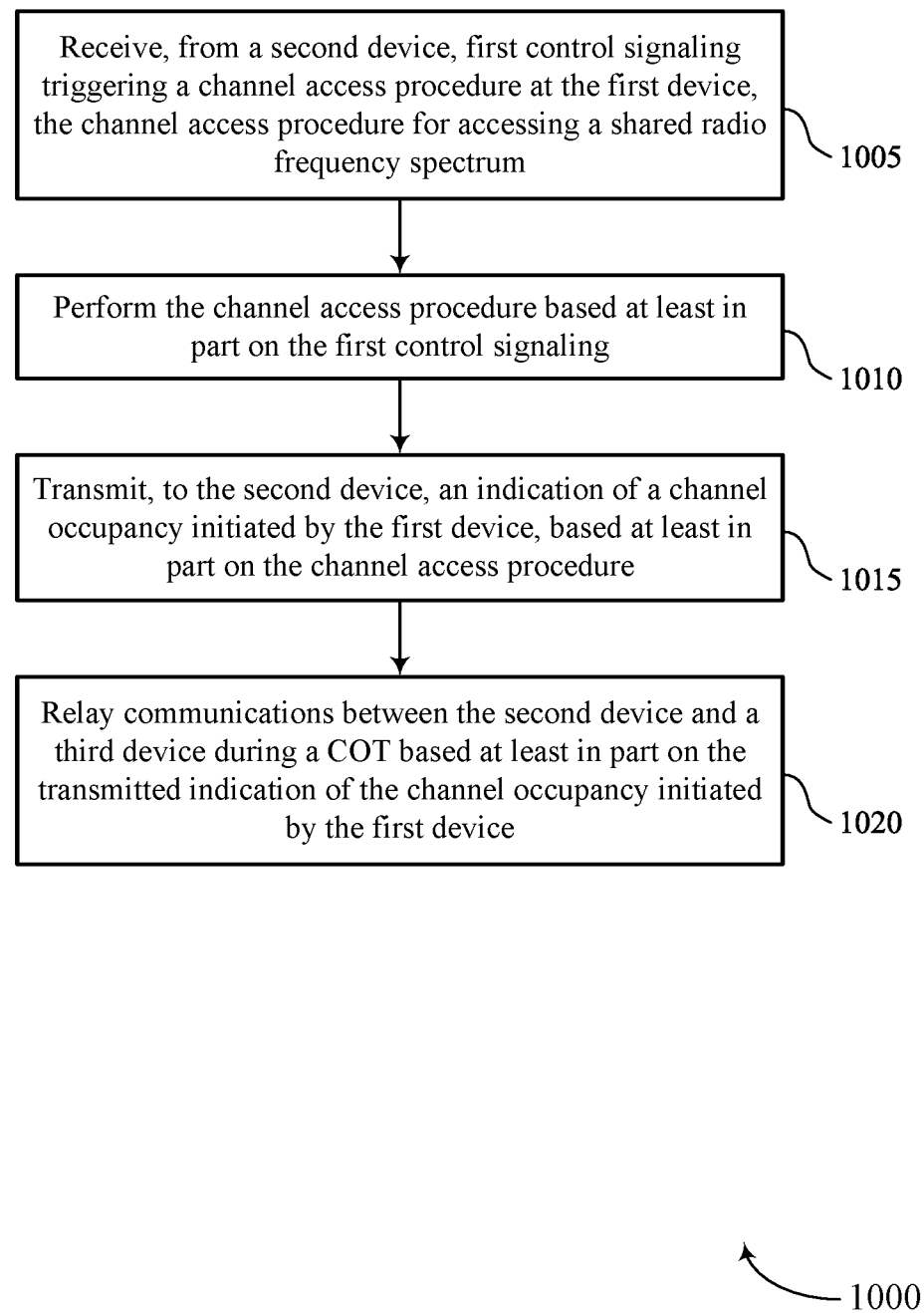
FIGS. 10 and 11 show flowcharts illustrating methods that support repeater initiated COT for shared radio frequency spectrum in accordance with aspects of the present disclosure.

FIG. 10 shows a flowchart illustrating a method 1000 that supports repeater initiated COT for shared radio frequency spectrum in accordance with aspects of the present disclosure. The operations of the method 1000 may be implemented by a repeater device or its components as described herein. For example, the operations of the method 1000 may be performed by a repeater 160 as described with reference to FIGS. 1 through 9. In some examples, a repeater device may execute a set of instructions to control the functional elements of the repeater device to perform the described functions. Additionally or alternatively, the repeater device may perform aspects of the described functions using special-purpose hardware.

At 1005, the method may include receiving, from a second device (e.g., a base station 105 or a UE 115), first control signaling triggering a channel access procedure at the first device, the channel access procedure for accessing a shared radio frequency spectrum. The operations of 1005 may be performed in accordance with examples as disclosed herein. In some examples, aspects of the operations of 1005 may be performed by a trigger component 825 as described with reference to FIG. 8.

At 1010, the method may include performing the channel access procedure based on the first control signaling. The operations of 1010 may be performed in accordance with examples as disclosed herein. In some examples, aspects of the operations of 1010 may be performed by a channel access component 830 as described with reference to FIG. 8.

At 1015, the method may include transmitting, to the second device, an indication of a channel occupancy initiated by the first device, based on the channel access procedure. The operations of 1015 may be performed in accordance with examples as disclosed herein. In some examples, aspects of the operations of 1015 may be performed by a first indication component 835 as described with reference to FIG. 8.

At 1020, the method may include relaying communications between the second device and a third device (e.g., another base station 105 or another UE 115) during a COT based on the transmitted indication of the channel occupancy initiated by the first device. The operations of 1020 may be performed in accordance with examples as disclosed herein. In some examples, aspects of the operations of 1020 may be performed by a relay component 840 as described with reference to FIG. 8.

Figure 11:
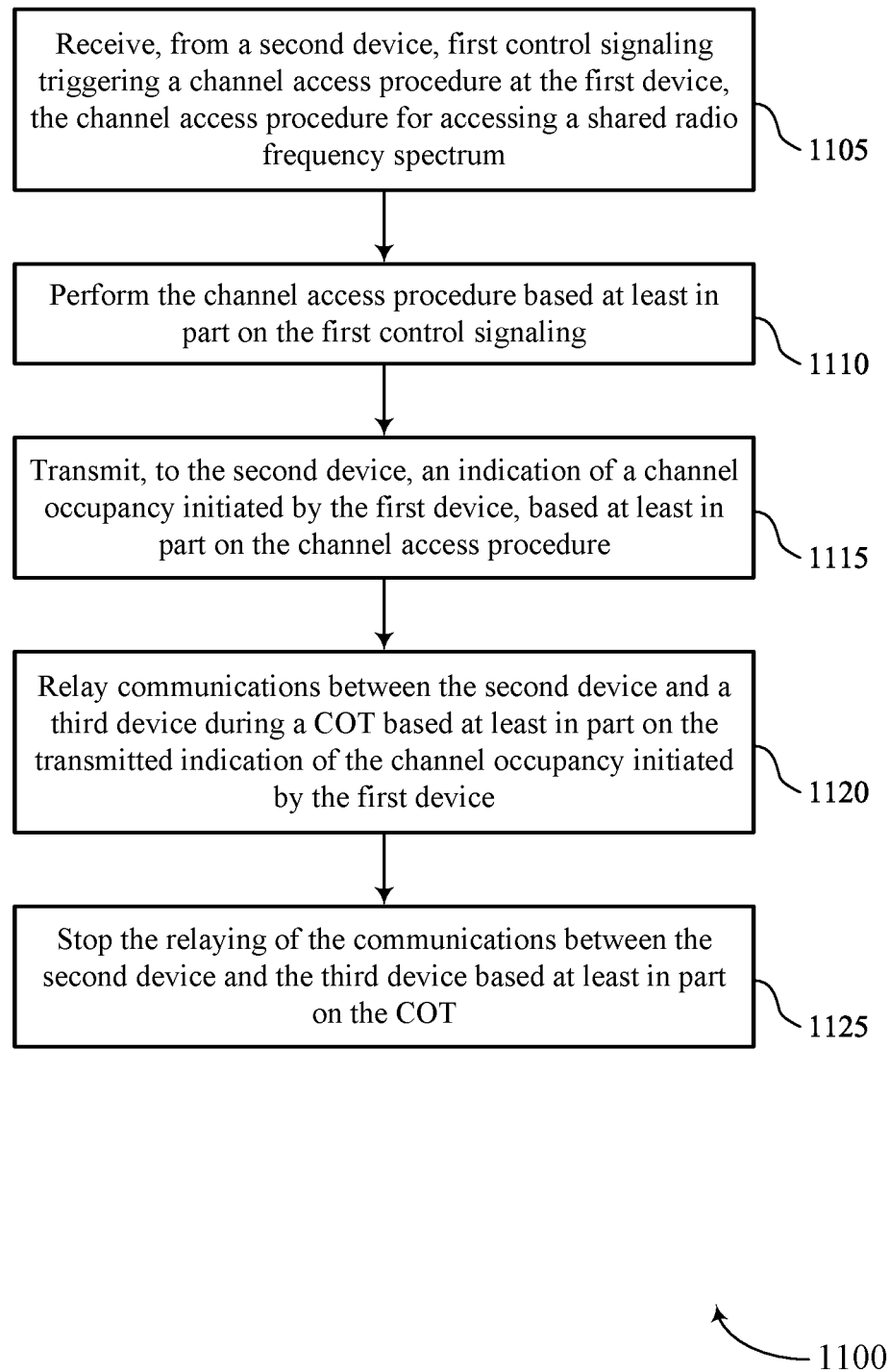

FIG. 11 shows a flowchart illustrating a method 1100 that supports repeater initiated COT for shared radio frequency spectrum in accordance with aspects of the present disclosure. The operations of the method 1100 may be implemented by a repeater device or its components as described herein. For example, the operations of the method 1100 may be performed by a repeater 160 as described with reference to FIGS. 1 through 9. In some examples, a repeater device may execute a set of instructions to control the functional elements of the repeater device to perform the described functions. Additionally or alternatively, the repeater device may perform aspects of the described functions using special-purpose hardware.

At 1105, the method may include receiving, from a second device (e.g., a base station 105 or a UE 115), first control signaling triggering a channel access procedure at the first device, the channel access procedure for accessing a shared radio frequency spectrum. The operations of 1105 may be performed in accordance with examples as disclosed herein. In some examples, aspects of the operations of 1105 may be performed by a trigger component 825 as described with reference to FIG. 8.

At 1110, the method may include performing the channel access procedure based on the first control signaling. The operations of 1110 may be performed in accordance with examples as disclosed herein. In some examples, aspects of the operations of 1110 may be performed by a channel access component 830 as described with reference to FIG. 8.

At 1115, the method may include transmitting, to the second device, an indication of a channel occupancy initiated by the first device, based on the channel access procedure. The operations of 1115 may be performed in accordance with examples as disclosed herein. In some examples, aspects of the operations of 1115 may be performed by a first indication component 835 as described with reference to FIG. 8.

At 1120, the method may include relaying communications between the second device and a third device (e.g., another base station 105 or another UE 115) during a COT based on the transmitted indication of the channel occupancy initiated by the first device. The operations of 1120 may be performed in accordance with examples as disclosed herein. In some examples, aspects of the operations of 1120 may be performed by a relay component 840 as described with reference to FIG. 8.

At 1125, the method may include stopping the relaying of the communications between the second device and the third device based on the COT. The operations of 1125 may be performed in accordance with examples as disclosed herein. In some examples, aspects of the operations of 1125 may be performed by a relay component 840 as described with reference to FIG. 8.

The following provides an overview of aspects of the present disclosure:

Aspect 1: A method for wireless communication at a first device, comprising: receiving, from a second device, first control signaling triggering a channel access procedure at the first device, the channel access procedure for accessing a shared radio frequency spectrum; performing the channel access procedure based at least in part on the first control signaling; transmitting, to the second device, an indication of a channel occupancy initiated by the first device, based at least in part on the channel access procedure; and relaying communications between the second device and a third device during a COT based at least in part on the transmitted indication of the channel occupancy initiated by the first device.

Aspect 2: The method of aspect 1, further comprising: stopping the relaying of the communications between the second device and the third device based at least in part on the COT.

Aspect 3: The method of aspect 2, further comprising: receiving, from the second device, a second indication indicating a lapsing of the COT, wherein stopping the relaying of the communications between the second device and the third device is further based at least in part on the second indication indicating the lapsing of the COT.

Aspect 4: The method of any of aspects 2 through 3, further comprising: determining that the COT satisfies a threshold value, the threshold value indicating a maximum COT, the threshold value is preconfigured or indicated by the first control signaling triggering the channel access procedure at the first device, wherein stopping the relaying of the communications between the second device and the third device is further based at least in part on determining that the COT satisfies the threshold value.

Aspect 5: The method of any of aspects 1 through 4, wherein transmitting the indication of the channel occupancy further comprises: generating a preamble sequence based at least in part on a configuration, the preamble sequence identifying the channel occupancy initiated by the first device; and transmitting, to the second device, the generated preamble sequence.

Aspect 6: The method of aspect 5, wherein the generated preamble comprises one or more of a maximum duration of the COT, or a scrambling between the generated preamble and an identifier associated with the first device.

Aspect 7: The method of any of aspects 1 through 6, wherein transmitting the indication of the channel occupancy further comprises: transmitting, in a control message over a control channel, the indication of the channel occupancy initiated by the first device, the control message comprising one or more of a UCI, a DCI, or a MAC-CE, the control channel comprising one or more of a PUCCH, a PUSCH, a PDCCH, or a PDSCH.

Aspect 8: The method of any of aspects 1 through 7, further comprising: receiving scheduling information on at least one resource of a set of resources allocated for transmitting, to the second device, the indication of the channel occupancy initiated by the first device, wherein the at least one resource corresponds to the at least one occasion, and wherein the scheduling information is included in the first control signaling.

Aspect 9: The method of any of aspects 1 through 8, further comprising: initiating the channel access procedure at the first device based at least in part on the first control signaling, wherein performing the channel access procedure is further based at least in part on initiating the channel access procedure at the first device.

Aspect 10: The method of aspect 9, further comprising: determining, based at least in part on the first control signaling, one or more of a timing offset associated with the channel access procedure, a periodicity associated with the channel access procedure, a type associated with the channel access procedure, or any combination thereof, wherein performing the channel access procedure is further based at least in part on one or more of the timing offset associated with the channel access procedure, the periodicity associated with the channel access procedure, the type associated with the channel access procedure, or any combination thereof.

Aspect 11: The method of any of aspects 1 through 10, further comprising: determining, based at least in part on the first control signaling, one or more of a timing offset associated with the COT, a periodicity associated with the COT, a threshold associated with the COT, one or more resources for indicating the COT, or any combination thereof.

Aspect 12: The method of any of aspects 1 through 11 further comprising: receiving, from the second device, second control signaling indicating assistance information associated with the channel access procedure, wherein performing the channel access procedure is further based at least in part on the second control signaling indicating assistance information.

Aspect 13: The method of aspect 12, further comprising: determining a channel access duration associated with the channel access procedure based at least in part on the assistance information, wherein performing the channel access procedure is further based at least in part on the channel access duration.

Aspect 14: The method of aspect 13, further comprising: determining a duration of a contention occasion associated with the channel access procedure based at least in part on the assistance information, wherein determining the channel access duration associated with the channel access procedure is based at least in part on the duration of the contention occasion.

Aspect 15: The method of aspect 14, further comprising: determining hybrid automatic repeat request feedback associated with the communications between the second device and the third device based at least in part on the assistance information, wherein determining the duration of the contention occasion associated with the channel access procedure is further based at least in part on the hybrid automatic repeat request feedback.

Aspect 16: The method of any of aspects 12 through 15, further comprising: determining an energy detection threshold based at least in part on the assistance information, wherein performing the channel access procedure is further based at least in part on the energy detection threshold.

Aspect 17: The method of any of aspects 12 through 16, further comprising: determining a configuration for sensing one or more beams in one or more beams directions associated with the channel access procedure based at least in part on the assistance information, wherein performing the channel access procedure is further based at least in part on the configuration for sensing the one or more beams in the one or more beams directions associated with the channel access procedure.

Aspect 18: The method of any of aspects 12 through 17, wherein the first control signaling comprises the assistance information and an LBT request associated with the channel access procedure, the channel access procedure comprising an LBT procedure.

Aspect 19: The method of any of aspects 12 through 18, wherein the first control signaling and the second control signaling are received from a control node or a scheduling node.

Aspect 20: The method of any of aspects 12 through 19, wherein the first control signaling and the second control signaling are received during a previous COT, the previous COT initiated by the first device or the second device.

Aspect 21: The method of any of aspects 12 through 20, wherein the first control signaling and the second control signaling are transmitted over an unshared radio frequency spectrum.

Aspect 22: The method of any of aspects 12 through 21, wherein the first control signaling and the second control signaling comprises one or more of a DCI, a MAC-CE, an RRC message, or a SCI message.

Aspect 23: An apparatus for wireless communication at a first device, comprising a processor; memory coupled with the processor; and instructions stored in the memory and executable by the processor to cause the apparatus to perform a method of any of aspects 1 through 22.

Aspect 24: An apparatus for wireless communication at a first device, comprising at least one means for performing a method of any of aspects 1 through 22.

Aspect 25: A non-transitory computer-readable medium storing code for wireless communication at a first device, the code comprising instructions executable by a processor to perform a method of any of aspects 1 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication by a first device, comprising:
    receiving, from a second device, first control signaling triggering a channel access procedure at the first device, the channel access procedure comprising a listen-before-talk procedure for accessing a shared radio frequency spectrum;
    performing the listen-before-talk procedure based at least in part on the first control signaling;
    transmitting, to the second device, an indication of a channel occupancy time initiated by the first device, based at least in part on successfully performing the listen-before-talk procedure; and
    relaying communications by the first device between the second device and a third device during the channel occupancy time initiated by the first device based at least in part on the transmitted indication of the channel occupancy time initiated by the first device.

2. The method of claim 1, further comprising:
    stopping the relaying of the communications between the second device and the third device based at least in part on the channel occupancy time.

3. The method of claim 2, further comprising:
    receiving, from the second device, a second indication indicating a lapsing of the channel occupancy time,
    wherein stopping the relaying of the communications between the second device and the third device is further based at least in part on the second indication indicating the lapsing of the channel occupancy time.

4. The method of claim 2, further comprising:
    determining that the channel occupancy time satisfies a threshold value, the threshold value indicating a maximum channel occupancy time, the threshold value is preconfigured or indicated by the first control signaling triggering the listen-before-talk procedure at the first device,
    wherein stopping the relaying of the communications between the second device and the third device is further based at least in part on determining that the channel occupancy time satisfies the threshold value.

5. The method of claim 1, wherein transmitting the indication of the channel occupancy time further comprises:
    generating a preamble sequence based at least in part on a configuration, the preamble sequence identifying the channel occupancy time initiated by the first device; and
    transmitting, to the second device, the generated preamble sequence.

6. The method of claim 5, wherein the generated preamble comprises one or more of a maximum duration of the channel occupancy time, or a scrambling between the generated preamble and an identifier associated with the first device.

7. The method of claim 1, wherein transmitting the indication of the channel occupancy time further comprises:
    transmitting, in a control message over a control channel, the indication of the channel occupancy time initiated by the first device, the control message comprising one or more of an uplink control information, a downlink control information, or a medium access control-control element, the control channel comprising one or more of a physical uplink control channel, a physical uplink shared channel, a physical downlink control channel, or a physical downlink shared channel.

8. The method of claim 1, further comprising:
    receiving scheduling information on at least one resource of a set of resources allocated for transmitting, to the second device, the indication of the channel occupancy time initiated by the first device,
    wherein the scheduling information is included in the first control signaling.

9. The method of claim 1, further comprising:
initiating the listen-before-talk procedure at the first device based at least in part on the first control signaling,
wherein performing the listen-before-talk procedure is further based at least in part on initiating the listen-before-talk procedure at the first device.

10. The method of claim 9, further comprising:
determining, based at least in part on the first control signaling, one or more of a timing offset associated with the listen-before-talk procedure, a periodicity associated with the listen-before-talk procedure, a type associated with the listen-before-talk procedure, or any combination thereof,
wherein performing the listen-before-talk procedure is further based at least in part on one or more of the timing offset associated with the listen-before-talk procedure, the periodicity associated with the listen-before-talk procedure, the type associated with the listen-before-talk procedure, or any combination thereof.

11. The method of claim 1, further comprising:
determining, based at least in part on the first control signaling, one or more of a timing offset associated with the channel occupancy time, a periodicity associated with the channel occupancy time, a threshold associated with the channel occupancy time, one or more resources for indicating the channel occupancy time, or any combination thereof.

12. The method of claim 1 further comprising:
receiving, from the second device, second control signaling indicating assistance information associated with the listen-before-talk procedure,
wherein performing the listen-before-talk procedure is further based at least in part on the second control signaling indicating assistance information.

13. The method of claim 12, further comprising:
determining a channel access duration associated with the listen-before-talk procedure based at least in part on the assistance information,
wherein performing the listen-before-talk procedure is further based at least in part on the channel access duration.

14. The method of claim 13, further comprising:
determining a duration of a contention occasion associated with the listen-before-talk procedure based at least in part on the assistance information,
wherein determining the channel access duration associated with the listen-before-talk procedure is based at least in part on the duration of the contention occasion.

15. The method of claim 14, further comprising:
determining hybrid automatic repeat request feedback associated with the communications between the second device and the third device based at least in part on the assistance information,
wherein determining the duration of the contention occasion associated with the listen-before-talk procedure is further based at least in part on the hybrid automatic repeat request feedback.

16. The method of claim 12, further comprising:
determining an energy detection threshold based at least in part on the assistance information,
wherein performing the listen-before-talk procedure is further based at least in part on the energy detection threshold.

17. The method of claim 12, further comprising:
determining a configuration for sensing one or more beams in one or more beams directions associated with the listen-before-talk procedure based at least in part on the assistance information,
wherein performing the listen-before-talk procedure is further based at least in part on the configuration for sensing the one or more beams in the one or more beams directions associated with the listen-before-talk procedure.

18. The method of claim 12, wherein the first control signaling comprises the assistance information and a listen-before-talk request associated with the listen-before-talk procedure.

19. The method of claim 12, wherein the first control signaling and the second control signaling are received from a control node or a scheduling node.

20. The method of claim 12, wherein the first control signaling and the second control signaling are received during a previous channel occupancy time, the previous channel occupancy time initiated by the first device or the second device.

21. The method of claim 12, wherein the first control signaling and the second control signaling are transmitted over an unshared radio frequency spectrum.

22. The method of claim 12, wherein the first control signaling and the second control signaling comprises one or more of a downlink control information, a medium access control-control element, a radio resource control message, or a sidelink control information message.

23. A first device for wireless communication, comprising:
one or more memories storing processor-executable code; and
one or more processors coupled with the one or more memories and individually or collectively operable to execute the code to cause the first device to:
receive, from a second device, first control signaling triggering a channel access procedure at the first device, the channel access procedure comprising a listen-before-talk procedure for accessing a shared radio frequency spectrum;
perform the listen-before-talk procedure based at least in part on the first control signaling;
transmit, to the second device, an indication of a channel occupancy time initiated by the first device based at least in part on successfully performing the listen-before-talk procedure; and
relay communications by the first device between the second device and a third device during the channel occupancy time initiated by the first device based at least in part on the transmitted indication of the channel occupancy time initiated by the first device.

24. The first device of claim 23, wherein the one or more processors are individually or collectively further operable to execute the code to cause the first device to:
stop the relaying of the communications between the second device and the third device based at least in part on the channel occupancy time.

25. The first device of claim 24, wherein the one or more processors are individually or collectively further operable to execute the code to cause the first device to:
receive, from the second device, a second indication indicating a lapsing of the channel occupancy time,
wherein to stop the relaying of the communications between the second device and the third device is further based at least in part on the second indication indicating the lapsing of the channel occupancy time.

26. The first device of claim 24, wherein the one or more processors are individually or collectively further operable to execute the code to cause the first device to:
   determine that the channel occupancy time satisfies a threshold value, the threshold value indicating a maximum channel occupancy time, the threshold value is preconfigured or indicated by the first control signaling triggering the listen-before-talk procedure at the first device,
   wherein to stop the relaying of the communications between the second device and the third device is further based at least in part on determining that the channel occupancy time satisfies the threshold value.

27. The first device of claim 23, wherein the one or more processors are individually or collectively further operable to execute the code to cause the first device to:
   initiate the listen-before-talk procedure at the first device based at least in part on the first control signaling,
   wherein to perform the listen-before-talk procedure is further based at least in part on initiating the listen-before-talk procedure at the first device.

28. The first device of claim 27, wherein the one or more processors are individually or collectively further operable to execute the code to cause the first device to:
   determine, based at least in part on the first control signaling, one or more of a timing offset associated with the listen-before-talk procedure, a periodicity associated with the listen-before-talk procedure, a type associated with the listen-before-talk procedure, or any combination thereof,
   wherein to perform the listen-before-talk procedure is further based at least in part on one or more of the timing offset associated with the listen-before-talk procedure, the periodicity associated with the listen-before-talk procedure, the type associated with the listen-before-talk procedure, or any combination thereof.

29. A first device for wireless communication comprising:
   means for receiving, from a second wireless communication device, first control signaling triggering a channel access procedure at the first wireless communication device, the channel access procedure comprising a listen-before-talk procedure for accessing a shared radio frequency spectrum;
   means for performing the listen-before-talk procedure based at least in part on the first control signaling;
   means for transmitting, to the second wireless communication device, an indication of a channel occupancy time initiated by the first wireless communication device based at least in part on successfully performing the listen-before-talk procedure; and
   means for relaying communications by the first wireless communication device between the second device and a third device during the channel occupancy time initiated by the first device based at least in part on the transmitted indication of the channel occupancy time initiated by the first device.

30. A non-transitory computer-readable medium storing code for wireless communication, the code comprising instructions executable by one or more processors to:
   receive, from a second device, first control signaling triggering a channel access procedure at the first device, the channel access procedure comprising a listen-before-talk procedure for accessing a shared radio frequency spectrum;
   perform the listen-before-talk procedure based at least in part on the first control signaling;
   transmit, to the second device, an indication of a channel occupancy time initiated by the first device based at least in part on successfully performing the listen-before-talk procedure; and
   relay communications by the first device between the second device and a third device during the channel occupancy time initiated by the first device based at least in part on the transmitted indication of the channel occupancy time initiated by the first device.

* * * * *